US005644709A

United States Patent [19]
Austin

[11] Patent Number: 5,644,709
[45] Date of Patent: Jul. 1, 1997

[54] METHOD FOR DETECTING COMPUTER MEMORY ACCESS ERRORS

[75] Inventor: Todd Michael Austin, Madison, Wis.

[73] Assignee: Wisconsin Alumni Research Foundation, Madison, Wis.

[21] Appl. No.: 237,041

[22] Filed: Apr. 21, 1994

[51] Int. Cl.$^6$ .................................................... G06F 11/00
[52] U.S. Cl. ........................... 395/185.06; 395/185.08; 395/411; 395/481
[58] Field of Search ................... 395/185.06, 185.08, 395/185.07, 185.02, 411, 427, 481, 494

[56] References Cited

U.S. PATENT DOCUMENTS

| | | | |
|---|---|---|---|
| 4,903,194 | 2/1990 | Houdek et al. | 395/185.06 |
| 5,193,180 | 3/1993 | Hastings | 395/575 |
| 5,335,344 | 8/1994 | Hastings | 395/575 |
| 5,388,254 | 2/1995 | Betz et al. | 395/185.08 |

OTHER PUBLICATIONS

Austin et al., "Efficient Detection of All Pointer and Array Access Errors", Sigplan 94, vol. 29, No. 5, pp. 290–301. Jun. 1994.

Andrew Ginter, "Design Alternatives for a Cooperative Garbage Collector for the C++ Programming Language," Research Report No. 91/417/1, Department of Computer Science, University of Calgary, Jan. 1991.

A.V. Aho, et al. *Compilers: Principles, Techniques and Tools*, Sec. 5.4, pp. 296–297, Addison–Wesley, Reading, MA 1986.

Jonathan M. Asuru, "Optimization of Array Subscript Range Checks," pp. 109–118, *ACM Letters on Programming Languages and Systems*, Jun., 1992.

Bowen Alpern, et al., "Detecting Equality of Variables in Programs," In *Conference Record of the 15th Annual ACM Symposium on Principles of Programming Languages*, pp. 1–11, San Diego, CA, Jan. 1988.

Hans–Juergen Boehm, "Space Efficient Conservation Garbage Collection," *Proceedings of the ACM SIGPLAN '93 Conference on Programming Language Design and Implementation*, 28(6):197–204, Jun., 1993.

Hans–Juergen Boehm, et al., "Garbage Collection in an Uncooperative Environment" *Software–Pracitce and Experience*, 18(9):807–820, Sep., 1988.

MIPS Computer Corporation. MIPS Fortrann 77 Compiler (f77) User's Guide, 1987.

John R. Ellis, et al. "Safe, Efficient Garbage Collection for C++," Report 102, DEC Systems Research Center, Jun., 1993.

D.R. Edelson, et al. "Smart Pointers: They're Smart, but They're Not Pointers," *Proceedings of the 1991 Usenix C+ Conference*, Apr., 1991.

Anthony J. Field, et al., "Memoization," *Functional Programming*, Chapter 19, pp. 505–506, Addison–Wesley Publishing Company, 1988.

(List continued on next page.)

*Primary Examiner*—Robert W. Beausoliel, Jr.
*Assistant Examiner*—Joseph E. Palys
*Attorney, Agent, or Firm*—Schwegman, Lundberg, Woessner & Kluth, P.A.

[57] ABSTRACT

A method for detecting memory access errors which occur while executing a computer program. Spatial and temporal attributes are provided for a data object and these attributes are associated with each pointer to that data object. On a dereference to a pointer, a memory access check is performed which determines (a) whether the dereference falls outside the address range within which valid accesses may be made to the data object, and (b) whether the dereference falls outside the time period within which valid accesses may be made to the data object. If the dereference falls outside the valid address range, a spatial error is flagged. If the dereference falls outside the valid time period, a temporal error is flagged. In addition, a method is described for converting a preexisting source-language program file into a safe program and a method is described for optimizing memory-access checks.

20 Claims, 18 Drawing Sheets

OTHER PUBLICATIONS

Charles N. Fischer, et al., "The Implementation of Run-Time Diagnostics in Pascal," *IEEE Transactions on Software Engineering*, SE–6(4):313–319, 1980.

Andrew Ginter, Abstract, "Design Alternatives for a Cooperative Garbage Collector for the C++ Programming Language," Technical Report 91/417/01, Dept. of Computer Science, University of Calgary, 1992.

Rajiv Gupta, "A Fresh Look at Optimization Array Bound Checking," *Proceedings of the ACM SIGPLAN '90 Conference on Programming Language Design and Implementation*, pp. 272–282, Jun., 1990.

William H. Harrison, "Compiler Analysis of the Value Ranges for Variables," *IEEE Transactions on Software Engineering*, 3:(3):243–250, 1977.

Reed Hastings, et al. "Purify:Fast Detection of Memory Leaks and Access Errors," *Proceedings of the Winter Usenix Conference*, 1992.

Stephen Kaufer, et al., "Saber–C: An Interpreter–based Programming Environment for the C Language," *Proceedings of the Summer Usenix Conference*, pp.161–171, 1988.

James R. Larus, "Efficient Program Tracing," *IEEE Computer*, 26(5):52–61, May, 1993.

Peter A. Steenkiste, "The Implementation of Tags and Run–Time Checking," *Topics in Advanced Language Implementation*, The MIT Press, Cambridge, MA 1991.

Barton P. Miller, et al., "An Empirical Study of the Reliability of UNIX Utilities," *Communications of the ACM*, 33(12):32–44, Dec., 1990.

Graham Ross, "Integral C—A Practical Environment for C Programming," *Proceedings of the ACM SIG–Sof/SIGPLAN Software Engineering Symposium on Practical Software Development Environments(SIGPLAN Notices)*, pp. 42–48, Association for Computing Machinery, Jan., 1987.

Barry K. Rosen, et al., "Global Value Numbers and Redundant Computations," *Conference Record of the 15th Annual ACM Symposium on Practical Software Development Environments (SIGPLAN Notices)*, pp. 12–27, San Diego, CA, Jan. 1988.

Mark Sullivan, et al., "Software Defects and Their Impact on System Availability—A Study of Field Failures in Operating Systems," *Digest of the 21st International Symposium on Fault Tolerant Computing*, pp. 2–9, Jun. 1991.

Joseph L. Steffen, "Adding Run–time Checking to the Portable C Compiler," *Software—Practice and Experience*, 22(4):305–316, 1992.

Benjamin Zorn, et al., "A Memory Allocation Profile for C and Lisp Programs," *Proceedings of the Summer Usenix Conference*, pp. 223–237, 1988.

Samuel C. Kendall, "Bcc: Runtime Checking for C Programs," *USENIX Software Tools*.

LAST POINTER DEREFERENCE p = &f -> g -> h[3].i -> j.k[4]

103 ACCESS PATH PREFIX

105 ACCESS PATH SUFFIX f -> g -> h[3].i j.k[4]

SAFE POINTER:

p.value = &f -> g -> h[3].i -> j.k[4]

p.base = &f -> g -> h[3].i -> j.k p.size = sizeof ( f -> g -> h[3].i -> j.k )

p.storageClass = f -> g -> h[3].i.storageClass p.capability = f -> g -> h[3].i.capability

```
void *malloc(unsigned size) {
   void *p;
   p.base = p.value = unsafe_malloc(size);
   p.size = size;
   p.storageClass = Heap;
   p.capability = NextCapability();
   InsertCapability(p.capability);
   bzero(p.value, size); /* also make capability NEVER==0*/
   return p;
}
void *calloc(unsigned nelem, unsigned elsize) {
   return malloc(nelem*elsize);
} void *realloc(void *p, unsigned size) {
   void *new;
   new = malloc(size);
   bcopy(p.base, new.base, min(size, p.size));
   free(p);
   return new;
} void free(void *p) {
   if (p.storageClass != Heap)
         FlagNonHeapFree();
   if (!ValidCapability(p.capability))
         FlagDuplicateFree();
   if (p.value != p.base)
         FlagNonOriginalFree();
   DestroyCapability(p.capability);
   unsafe_free(p.value);
}
```

FIG. 11.

```
void Func(int a) {
    /* procedure prologue */
    unsigned frameCapability = NextCapability();
    InsertCapability(frameCapability);
    ZeroFramePointers();
            /* also make capability NEVER == 0 */
    .
    .
    .

/* procedure epilogue, common function exit point */
    DestroyCapability(frameCapability);
    return;
}
```

*FIG. 12.*

| | SAFE POINTER p | SAFE POINTER q | capability store |
|---|---|---|---|
| struct{<br>  char a;<br>  char b[100];<br>} x, *p;<br>char *q; | [x,x,x,x,NEVER] | [x,x,x,x,NEVER] | { }<br>{ }<br>{ } |
| p = &x;<br>*p;  /* no error */<br>q = &p->b[10];<br>q--;<br>*q; | [1000,1000,101,Global,FOREVER]<br>=<br>=<br>=<br>= | [x,x,x,x,NEVER]<br>=<br>[1011,1001,100,Global,FOREVER]<br>[1010,1001,100,Global,FOREVER]<br>= | =<br>=<br>=<br>=<br>= |
| p -= 2;<br>*p;  /* error!!! */ | [798,1000,101,Global,FOREVER] | = | = |

*FIG. 13.*

| | SAFE POINTER p | SAFE POINTER q | capability store |
|---|---|---|---|
| char *p, *q; | [x,x,x,NEVER] | [x,x,x,NEVER] | { } |
| p = malloc(10); | [2000,2000,10,Heap,1] | [x,x,x,NEVER] | { 1 } |
| q = p + 6; | " | [2006,2000,10,Heap,1] | " |
| *q;    /* no error */ | " | " | " |
| free(p); | " | " | { } |
| p = malloc(10); | [2000,2000,10,Heap,2] | " | { 2 } |
| *q;    /* error!!! */ | " | " | " |

*FIG. 14.*

```
void ValidateAccess(<type> *addr) {
   if (freeCount != currentFreeCount) {
      if ((storageClass != Global) &&
          (!ValidCapability(capability)))
         FlagTemporalError();
      freeCount = currentFreeCount;
   }
   if (lastDerefAddr != addr) {
      if (((unsigned)addr-(unsigned)base) >
           (size-sizeof(<type>)))
         FlagSpatialError();
      lastDerefAddr = addr;
   }
         /* valid access! */
}
```

*FIG. 15.*

METHOD FOR DETECTING COMPUTER MEMORY ACCESS ERRORS

FIELD OF THE INVENTION

The present invention relates to computer programming methods, and more specifically to a method for detecting computer memory access errors during program execution.

BACKGROUND OF THE INVENTION

Conventional compute program validation techniques contemplate checking the "type" of the access requested against the "type" of the data item being accessed. (A data item is often referred to as an "object" or a "data object".) An analogy might be to describe the attempted access's type as a key, and the object's type as a lock. The computer program compiler and/or run-time support could check the lock (as defined by the object type of the data object) to prevent accesses to that data object by any attempted access whose key (as defined by the access type of the access) does not meet the requirements of that lock. For example, the C programming language defines many different object types, some examples being integer (int), floating point (float), or pointer (*). When an expression in the program attempts to access the object, the compiler checks the access type of the access against the object type of the object. An attempt to access an integer object with a floating point access should be detected as an error by the compiler, and flagged as such.

In the following discussion, a pointer is a program variable which contains the address of another variable and also possibly contains attributes describing the variable pointed to; a pointer can be used to derive an address (called a pointer value) to be used to access a data object located in computer memory. Generally, a pointer is also located in computer memory (either in storage or in a register). A pointer provides one level of indirection, in that rather than addressing the data item itself, a program can address the pointer, which in turn provides the pointer value used to address the data item.

The referent of a pointer is the variable (also called the data object or the object) whose memory address is contained in the pointer. The contents of a pointer can be copied into other pointers, and thus several different pointers to a single referent may exist at the same time.

The type of a pointer specifies certain attributes of the referent (e.g., specifying to the compiler that the referent is "integer" type as opposed "floating point" type).

A memory access is, e.g., a read or a write to a referent.

The term dereference is used as a blanket term for any indirect memory access (i.e., a memory access through use of a pointer) of a referent—either through application of the dereference operator (e.g., '*' or '->' in C) to a pointer, or through indexing an array or pointer variable (e.g., '[]' in C).

Programming errors are costly, both in terms of time and money. Memory access errors are particularly troublesome. A memory access error is any dereference of a pointer or subscripted array reference which attempts to read or write storage outside of the referent. This attempted access can either be outside of the address bounds (also called the a address space) of the referent, causing a spatial access error, or outside of the lifetime of the referent, causing a temporal access error. Indexing past the end of an array is a typical example of a spatial access error. A typical temporal access error is assigning to a heap allocation after it has been freed.

Memory access errors are possible in programming languages with arrays, pointers, local references, or explicit dynamic storage management and are an important class of errors to reliably detect. For example, in {Miller:90}, Miller et al. injected random inputs (a.k.a. "fuzz") into a number of UNIX utilities. On systems from six different vendors, nearly all of the seemingly mature programs could be coaxed into dumping core. The most prevalent errors detected were memory access errors. In {Sullivan:91}, Sullivan and Chillarege examined IBM MVS software error reports over a four year period. Nearly 50% of all reported software errors examined were due to pointer and array access errors. Furthermore, of these errors, 25% were temporal access errors.

Memory access errors are difficult to detect and fix because the effects of a memory access error may not manifest themselves except under exceptional conditions and, when they do occur, they may be difficult to reproduce. In addition, once the error is reproduced, it may be very difficult to correlate the program error to the memory access error.

Consider the following C function:

```
int FindToken(int *data, int count, int token) {
    int i = 0, *p = data;
    while ((i < count) && (*p != token)) {
        p++; i++;
    }
    return (*p == token) ; //error: this tests beyond data if no
        token is found
}
```

This function contains a latent memory access error in the return statement expression. In operation, the function will reference the word immediately following the array referenced by the pointer data if the array does not contain the token; if the word immediately following the army then does contain the token, the wrong value will be returned by return (*p==token);. To avoid this error, the expression return (*p==token); should be changed to return (i<count);.

This function illustrates the three difficulties in finding and fixing memory access errors. First, FindToken() will only produce an incorrect result if the word following the array referenced by data contains the same value as token (or is inaccessible storage). This event is unlikely if the word contains an arbitrary value. Second, if FindToken() creates an incorrect result, it will be difficult to recreate during debugging. The programmer will have to condition the inputs of the program such that the word following the array referenced by data once again contains the same value as token. If the value of the illegally accessed word is independent of the value of token, the probability of success will be very low. Third, correlating the visible errors of the program to the incorrect actions of FindToken() may be very difficult. This connection may be very subtle and may not be visible for a long period of time.

Debugging can be viewed as an attempt to correlate a program fault to a program error. A program error is defined as an output of a program that is incorrect with respect to the specification of that program—this effect is what the users see. The program fault, on the other hand, is the initial incorrect condition (possibly many) that ultimately caused the error condition to occur. The primary goal of any good debugging environment is to detect errors and provide a good correlation between errors and faults. It is preferable to detect memory access errors immediately, thus creating perfect correlation between the error and the fault.

Many execution environments do provide some level of protection against memory access errors. For example, in most UNIX based systems, a store to the program text will cause the operating system to terminate execution of the program (usually with a core dump). UNIX typically provides storage protection on a segment granularity—the segments are the program text, data, and stack. Other, more hostile environments such as MS-DOS, do not offer such luxuries, and stores to the program text may or may not manifest themselves as a program error. If a program error does occur, correlating it to a fault may be difficult, if not impossible.

As programs become larger and more complex, there is a need for more sophisticated and comprehensive development tools to help the programmer "debug" these programs. In particular, there is a movement in the programming community towards "safe programming" techniques, languages and tools. Unfortunately, many of these safe programming techniques sacrifice the expressiveness otherwise available to the programmer using a programming language like C or C++.

One safe programming technique is to check the "spatial validity" of a particular pointer value used to access a particular data object, e.g., checking that the access goes to an address which is within the address bounds defined for that object. Any program which incorporates such spatial validity checks is said to exhibit "spatial safety". Ideally, the tools used by the programmer would check each attempted access for spatial validity, and would detect, flag, and identify any spatial error to the programmer so the error could be corrected.

Another safe programming technique is to check the "temporal validity" of using a particular pointer value to access a particular data object, e.g., checking that the data object is indeed allocated before it is written to, initialized before it is read, and is neither read nor mitten to after it has been freed or destroyed. Any program which incorporates such temporal validity checks is said to exhibit "temporal safety". Again, ideally, the programmer's tools would detect any temporal access error, and would flag the temporal error to the programmer so it could be corrected.

There are times when a programmer would like to be notified at the moment when a data object is accessed, or informed of how many times a data object is accessed or of which pointer(s) were used to access a particular data object. One technique for providing this object-access information to the programmer is to instrument a program by adding watchpoints. Instrumenting a program inserts additional code into a program in order to perform some auxiliary task. However, providing such watchpoints to a flexible and expressive language such as C/C++ can be difficult and cumbersome, and can significantly slow the execution speed of the program.

One technique for creating a safe programming environment for C is to employ a reference-chaining technique. This technique is similar to that used by many "smart pointer" implementations {Edelson:91,Ginter:92}. The reference-chaining technique creates a reference chain for each data object in the computer system and "roots" (or otherwise associates) each reference chain with its data object. This technique then inserts, into the reference chain rooted at the referent, any pointer to that referent which is generated through the use of an explicit memory allocation (e.g., the malloc() function in the C language), a reference operator (e.g., the '&' operator in the C language), or an assignment (e.g., the ,'=' operator in the C language). When a pointer is later destroyed (e.g., through memory deallocation, assignment, or return from a procedure), this technique then removes the pointer from the reference chain.

The reference-chaining technique has a number of useful properties. First, it is possible to ensure temporal safety by destroying all pointer values on a referent's chain when a referent is freed (i.e., when the memory for that referent is deallocated)—simply by stepping down the reference chain of that referent, and assigning NULL to all pointer values. Second, if a "destructed" pointer value is the last value in the referent's reference chain, it will be as the result of a storage-leak error having occurred, which can thus be detected immediately. (A storage leak is any area in storage to which the program can no longer generate a valid pointer (generating such a pointer is also called generating a "name" for the area). Storage-leak errors occur when the last accessible valid pointer to a heap object is overwritten. Without the ability to generate a name to the heap object, the heap object cannot be freed; hence it has "leaked" out of the heap.)

Unfortunately, the reference-chaining technique cannot be made to work reliably in C. It is relatively easy for the programmer to subvert the checking mechanism through recasting and type-less calls to free(), the memory deallocation function. Detection of storage-leak errors also fails in the presence of circular references, where a chain of pointers-to-pointers eventually refers back to an earlier pointer. Additionally, the reference-chaining technique can be unreliable became it depends on tracking pointer values.

Researchers have recently proposed providing complete program safety through limiting the constructs allowed in the programming language. The main thrust of this work is to design programming languages that support garbage collection reliably and portably (i.e., in a manner in which an implementation can be re-used across several different programming languages or computer architecture platforms). For example, in "Safe:GC" {Safe:GC}, a safe subset of C++ is defined. The safe subset does not permit any invalid pointers to be created. For example, pointers cannot be created via explicit pointer arithmetic. If requested, the compiler can enforce safety within a module by ensuring that the programmer does not use any intrinsically unsafe operations. The safe subset requires that some amount of checking be performed.

In addition, languages which can easily be made totally safe have existed for a long time. For example, many FORTRAN implementations provide complete safety through range checking (e.g., {MIPS:F77}). However, as in Safe:GC, these languages tend to be less expressive than intrinsically unsafe languages such as C or C++.

A number of commercially available memory access checking tools exist for memory access checking. For instance, Hastings and Joyce's "Purify" {Purify:92} uses a safe programming technique which is particularly easy to use because it does not require program source— all semantic changes to the program are applied to the object code. Purify supports both spatial- and temporal-access error checking to heap storage, through the use of a memory state map which is consulted at each load and each store that the program executes. Purify also provides uninitialized read detection and storage-leak error detection through a "conservative collector" {Boehm:93,Boehm:88} (described in more detail below). Certain heap spatial access errors are detected by bracketing both ends of any heap allocation with a "red zone". These zones are marked in the memory state map as inaccessible. If a load or store touches a red zone, then a memory access error is flagged. Temporal access errors are detected by setting the memory state of freed storage to "inaccessible".

Purify cannot detect all memory access errors. For example, errors caused by accessing past the end of an array into the storage region of the next variable cannot be detected, nor can errors caused by accessing storage that has been freed and then reallocated. These limitations occur because Purify does not determine the intended referent of memory accesses—it can only verify whether the accessed storage is "active". To increase the effectiveness of temporal access error checking, Purify "ages" the heap, i.e., holds freed storage in the "heap free list" longer than needed. This aging increases the storage requirements of programs that use the heap. In addition, although Purify is portable across programming languages (as long as each language is available on the given computer architecture platform for which Purify is implemented), it is not portable across platforms, and must be re-written for each platform on which it is desired.

Hastings' U.S. Pat. No. 5,193,180, issued Mar. 9, 1993 and assigned to Pure Software Inc., describes an implementation of the Purify technique. An object-code expansion program inserts new instructions and data between preexisting instructions and data of an object-code file; offsets are modified to reflect new positions of the preexisting instructions and data. The added instructions monitor substantially all memory accesses to check for the errors of writing to unallocated memory, and reading from unallocated or uninitialized memory. Dummy entries are added to the data section to aid in the detection of array-bounds violations and similar data errors. Furthermore, watchpoints can be established for more comprehensive monitoring.

Another safe programming technique is used in Steffen's "RTCC" {Steffen:92}. RTCC extends the functionality of the AT&T C language compiler "PCC" by adding spatial-error checking. RTCC attaches spatial object attributes to pointers and performs spatial access error checking. It does not, however, detect temporal access errors. In the implementation of RTCC, the issue of interfacing to library and system calls is addressed through "encapsulation"; Steffen also describes augmenting "sdb" (the UNIX system debugger) to provide users with transparent debugging support.

Another safe programming technique is used by "Code-Center" {Kaufer:88}. CodeCenter is an interpreted C language environment. The checking provided is very rich—it detects many memory access errors, and also provides dynamic type-checking (i.e., the type of the last store to memory must match the type of subsequent loads from memory), uninitialized read detection, errant free detection, and other useful checks. (The following heap-deallocation actions are called errant frees: freeing storage which has been previously freed; freeing non-heap (global or stack) storage; freeing an invalid address (one that does not refer to valid storage); freeing heap storage using an interior pointer (a pointer that points inside the allocation, rather than to the start of the allocation).) Object attributes (namely, type and size) are attached to each data object in storage when it is initialized and, when a reference is made to storage, the base and size attributes that are associated with the referent storage are also attached to the pointer value. Using this information, CodeCenter provides complete coverage for spatial access errors. The method used for temporal access checking cannot, however, detect all attempts to access freed storage after it has been reallocated for another purpose nor can it detect errors when pointer references are made to local variables. In addition, CodeCenter has large resource requirements; since CodeCenter programs run in an interpreter, the slow execution speed may discourage its use, and in the case of long-running programs, may preclude its use entirely.

Another safe programming technique is used by "Integral C" {Ross:87}. Integral C is an integrated programming environment for the C language. The user interface is very similar to CodeCenter. Internally, however, it does not employ an interpreter. Instead, as the programmer/user updates the C code, the C code is incrementally compiled (at function granularity) into machine code. Like RTCC, Integral C attaches only base and bound attributes to pointer values, and thus it can only detect spatial access errors.

Yet another safe programming technique is used by Fischer and LeBlanc's "UW-Pascal" compiler {Fischer:80}. UW-Pascal supports both temporal and spatial access error checking, but while UW-Pascal detects all spatial access errors, certain temporal access errors may not be detected if storage is reallocated. Because UW-Pascal lacks mutable pointers (pointers which may be used as terms in arithmetic expressions, thus allowing their value to be arbitrarily manipulated by the program) and dynamically-sized arrays, however, its access checking is much easier to implement than the error checking of other techniques which handle these more expressive and flexible programming-language features.

This paragraph briefly summarizes properties of the above described commercially-available systems. The technique used in Purify operates on object-code files, performs an object-code translation, provides spatial checks limited to heap spatial access errors, provides temporal checks limited to heap temporal access errors, and has extensions that can detect errant free's, uninitialized reads, and storage-leak errors. The technique used in RTCC operates on C files, uses a safe compiler, provides spatial checks for all spatial access errors, but provides no temporal checks. The technique used in CodeCenter operates on C or C++ files, uses an interpreter, provides spatial checks for all spatial access errors, provides temporal checks for some temporal access errors, and has extensions that can detect errant free's, uninitialized reads, type errors, arithmetic errors, etc. The technique used in Integral C operates on C files, uses a safe compiler, provides spatial checks for all spatial access errors, but provides no temporal checks. The technique used in UW-Pascal operates on Pascal files, uses a safe compiler, provides spatial checks for all spatial access errors, provides temporal checks for some temporal access errors, and has extensions that can detect errant free's, union type errors, arithmetic faults, etc.

A closely related area of work, which can benefit from the safe programming technique described in the invention, is storage-leak error detection. For languages like C and C++, storage-leak error detection is commonly implemented with a "conservative collector" {Boehm:93,Boehm:88}. A conservative collector sweeps memory looking for unreferenced storage. Because it is difficult to know where all pointers are located, the collector makes the conservative assumption that all program-accessible (non-heap) storage contains pointers. It then uses a traditional mark-and-sweep collection method.

While effective, this method has some drawbacks. First, storage-leak error detection is not immediate—it is usually applied only when the programmer demands it or when the program completes execution. Thus, for it to be useful, some dynamic information (for instance, a partial call-chain) must be kept with allocations in order for the programmer to deduce the circumstances under which the storage-leak error occurred. Second, the conservative assumption (that all program-accessible (non-heap) storage contains pointers) can cause "false hits". (False hits occur when "random" non-pointer values, which seem to reference heap storage, are mistaken for pointer values.) False hits can hide an actual storage-leak error. For instance, it may appear to the conservative collector as though some random number is a pointer to an area of storage on the heap; in actuality the storage pointed to by the random number leaked from the heap when the last valid pointer to it was destroyed in error. This problem is aggravated by large storage allocations. In such allocations it is more likely that non-pointer values may randomly and inadvertently reference the allocated storage; unfortunately, it is these large storage-leak errors that the programmer would most like to find. Third, if the program hides pointers (for example, by encoding type information in the upper bits of the address in a pointer) or does not keep all pointers within the address bounds of memory allocations, then the conservative collector may not recognize a valid pointer, and thus may erroneously regard a piece of heap storage as having leaked from the heap, when actually it is still in use.

(A call-chain is the state of the stack at some point in a program's execution; it is composed of a sequence of function names; functions higher in the call-chain call (possibly indirectly) the functions lower in the call chain; neighbors in the call-chain share a direct caller-callee relationship. A partial call-chain is a subset of the current complete call-chain, usually taken from the bottom of the complete call chain; partial call-chains are usually employed to reduce storage requirements.)

Zorn and Hilfinger's "mprof" takes a notably different approach to detecting storage-leak errors {Zorn:88}. During the analyzed program's execution, mprof maintains a table of partial call-chains, with each table entry containing a count of how many malloc()'s and free()'s have occurred to storage whose call-chains terminated with that sequence. Detecting storage-leak errors then involves adjusting the appropriate counts at calls to malloc() and free(). At a malloc(), the current call-chain is used to increment the appropriate malloc() counter. At a free(), a hidden pointer in the header of the freed allocation is used to increment the corresponding free() counter. At program termination, detection of storage-leak errors involves reporting the partial call-chains whose malloc() and free() counts differ.

Unlike conservative collection, the mprof technique does not suffer from false hits; that is, a true storage-leak error will always be detected. In addition, mprof provides a wealth of other information useful for optimizing a program's memory usage. The primary disadvantage of the mprof technique (compared to conservative collection) is that storage-leak diagnostics may only be gathered after execution completes, and many programs do not deallocate storage until program termination (e.g., in C, the call to exit() will ensure that all the program's resources are deallocated/reclaimed). This behavior can yield many (arguably) false indications of storage-leak errors.

None of the above methods provide the detection of temporal and spatial errors needed in the sophisticated programming environments of today without either impacting the flexibility of the programming language or overlaying an oppressive amount of overhead. What is needed is a method of detecting memory access errors which can operate over a variety of programming languages while having minimal impact on program execution.

SUMMARY OF THE INVENTION

The present invention provides a method for detecting memory access errors which occur while executing a computer program. Spatial and temporal attributes are provided for a data object and these attributes are associated with each pointer to that data object. On a dereference to a pointer, a memory access check is performed which determines (a) whether the dereference falls outside the address range within which valid accesses may be made to the data object, and (b) whether the dereference falls outside the time period within which valid accesses may be made to the data object. If the dereference falls outside the valid address range, a spatial error is flagged. If the dereference falls outside the valid time period, a temporal error is flagged.

According to another aspect of the present invention, a method is described for converting a preexisting source-language program file into a safe program. In particular, a method is described for optimizing the inclusion of a memory-access check. According to the method, memory deallocations are monitored and memory-access error checking code is skipped during periods when no new memory deallocations have occurred.

BRIEF DESCRIPTION OF THE DRAWING

FIG. 11 shows a C-language embodiment of a safe version of malloc() and free().

FIG. 12 shows a C-Language-like embodiment of a safe function call and return.

FIG. 13 shows an example of a spatial access error.

FIG. 14 shows an example of a temporal access error.

FIG. 15 shows a C-language embodiment of access checking code that optimizes run-time execution.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

It is preferable for a programming language execution environment to support memory access protection at the variable level, that is, an access to a variable should only be valid if the access is within the range (for both time and space) specified for the intended variable. All other accesses should immediately flag an error. Any program that supports these execution semantics is called a safe program.

Figure 1:
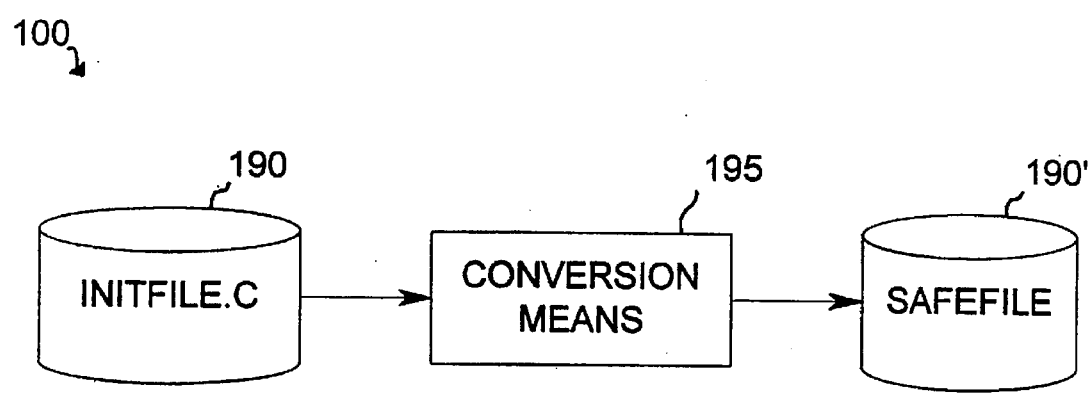
FIG. 1 is a partially schematic representation of the compute program correctness-enhancement method according to the invention.

FIG. 1 illustrates a computer program correctness-checking method 100 used to generate a safe program from unsafe program code. In the method of FIG. 1, a programmer writes an initial program 190 using any modern high-level language, e.g. C, C++, Ada, PL1, or Pascal. Such a program would typically be compiled, but could also be interpreted or translated. In one embodiment, as is depicted in FIG. 1, a source-level program file 190 is transformed, at compile-time, to use an extended pointer representation termed a safe pointer. A safe pointer contains the value of the pointer as well as one or more object attributes which describe the location, size and lifetime of the pointer referent. When a safe pointer value is created, either through the use of the reference operator (e.g. '&' in C) or through explicit storage allocation, the appropriate object attributes are attached. As the value is manipulated, through the use of pointer operators, the object attributes are transferred to any new safe pointer values. Detecting a memory access error then simply involves validating dereferences against the object attributes—if the access is within the address-space and time bounds of the object, it is permitted, otherwise an error is flagged and the access error is detected immediately. In the embodiment shown in FIG. 1, conversion means 195 takes the preexisting source-language program 190 ("INITFILE.C") as input and generates a safe program 190' ("SAFEFILE.C") as one step of the overall compilation process.

In one such embodiment, conversion means 195 is a general-purpose computer having a memory and operating under the control of a stand-alone computer program which is executed before the compilation step, whose output is another source-level program file 190'. Since conversion means 195 takes source-level programming language files as input, checking schemes can be comprehensive; the conversion means can determine the valid address bounds and temporal validity times for the referents in preexisting source-language program 190. In one particular embodiment, conversion means 195 might include a pre-compiler such as the AT&T USL C++ cfront Compiler Version 3.0.1 from AT&T Corp. and a compiler such as the MIPS CC compiler Version 2.1 available from MIPS Technology Inc., running on a DECstation 3100 computer from Digital Equipment Corp. of Maynard, Mass.

Figure 2:
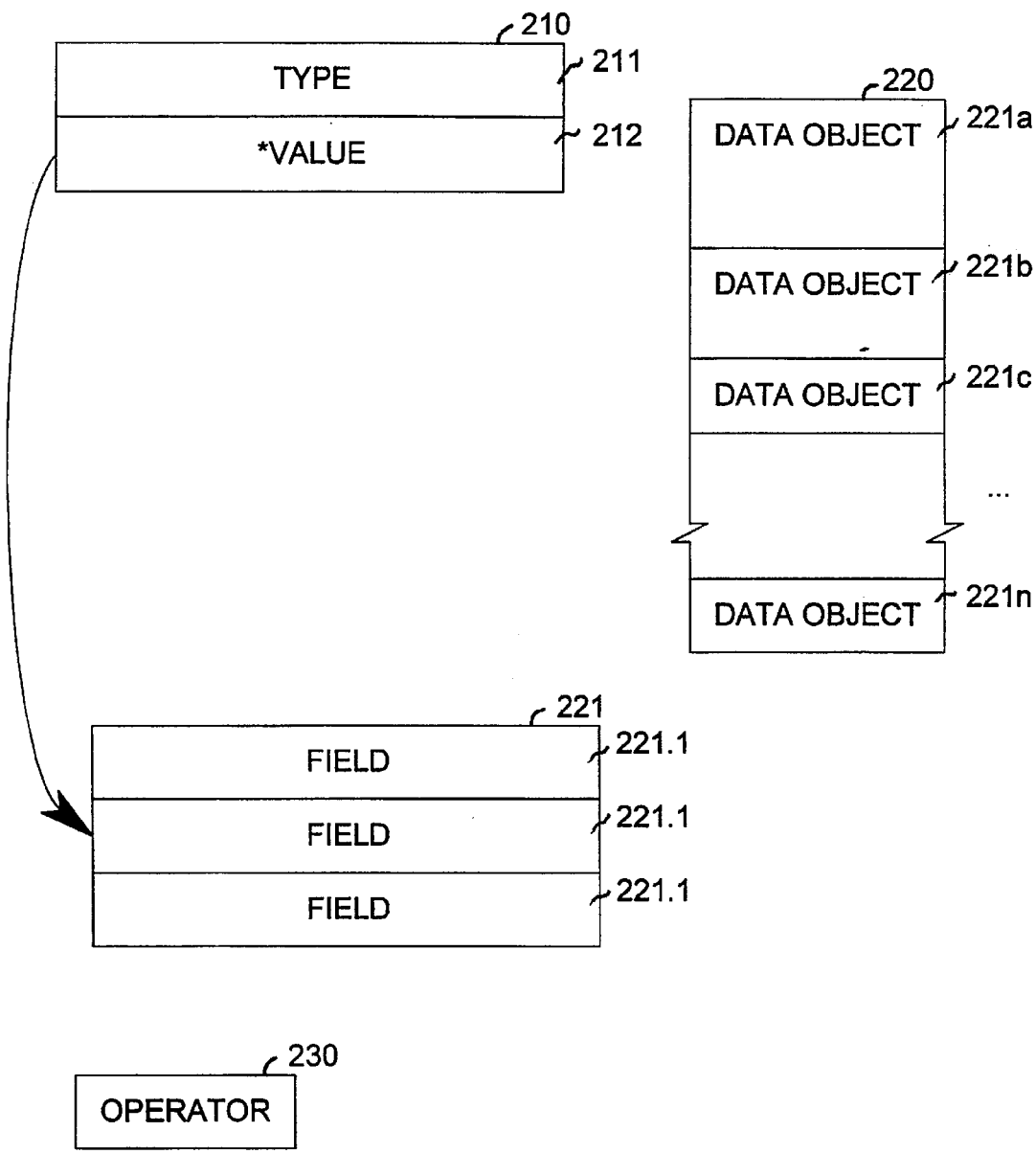
FIG. 2 is a detailed block diagram of certain features of a preexisting source-level program 190 of FIG. 1.

FIG. 2 is a block diagram 200 depicting pointers 210, data objects 221 and operators 230 of preexisting program 190. In FIG. 2 data object collection 220 depicts a collection of data objects 221 as defined in preexisting program 190. Each data object 221 could be a different type and/or size, as depicted by data objects 221a, 221a, 221c, . . . 221n.

Pointer 210 is typical of preexisting pointers specified in the preexisting source-level language file 190. Each pointer 210 contains a type field 211 which specifies the type of data object 221 to which pointer 210 refers and a *value field 212 which specifies the memory address of the data object 221 to which pointer 210 refers.

The preexisting program 190 typically will contain many pointers 210. Each pointer 210 would point to a single data object 221; however, there may be several different pointers 210 which point to the same data object 221. The preexisting program 190 will generally attempt many accesses to various data objects 221 using various pointers 210.

Operator 230 depicts an operator in preexisting program 190. Preexisting program 190 typically will contain many operators 230.

Figure 3:
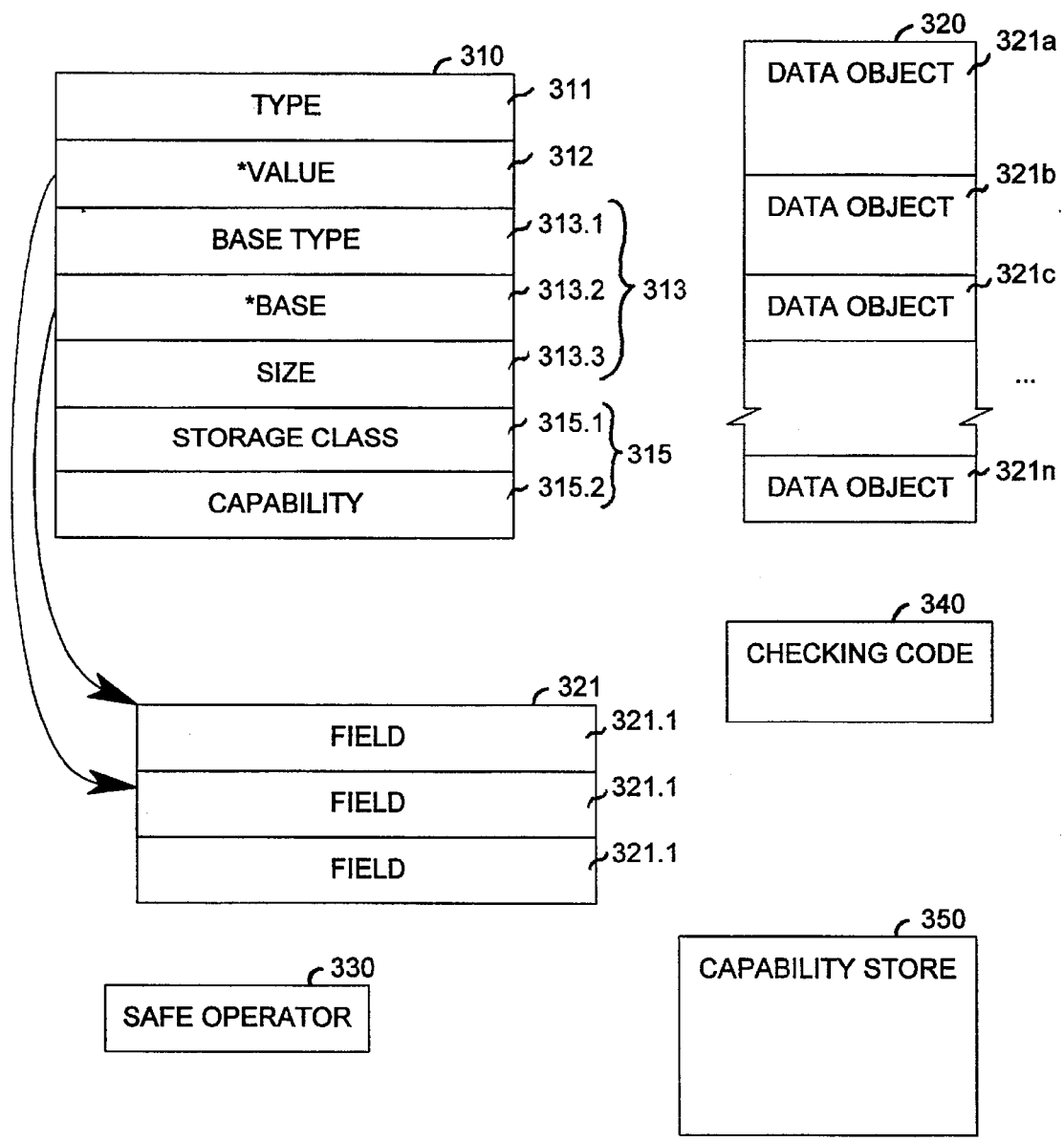
FIG. 3 is a detailed block diagram of certain features of a safe program 190' of FIG. 1.

To enforce access protection, the notion of a pointer value must be extended to include information about the referent. The idea is similar to tagged pointers used in many Lisp implementations. FIG. 3 depicts safe program data structures, including a safe pointer 310, a data object collection 320, safe operators 330 and a capability store 350 which can be used within safe program 190'. FIG. 3 also illustrates checking code 340 which is added to program code 190 to perform the memory access error checking.

Data object 321 is a block diagram of a typical data object generated by conversion means 195. Typically, conversion means 195 copies data object 221 into data object 321 without alteration; however, if data object 221 contains one or more pointers 210, each pointer 210 in data object 221 will be replaced with a corresponding safe pointer 310 in data object 321. Data object collection 320 depicts a collection of data objects 321 so generated by conversion means 195. Each data object 321 would be the same type and size as the corresponding data object 221, as depicted by data objects 321a, 321b, 321c, . . . 321n.

Safe operator 330 depicts a safe operator in safe program 190' generated by conversion means 195. The safe program 190' will contain one safe operator 330 corresponding to each operator 230 in preexisting program 190.

Capability store 350 stores temporal validity information used to perform temporal validity checks on dereferences to safe pointers 310. Checking code 340 contains additional program code inserted into the safe program 190' to perform memory access checks when safe operator 330 attempts to dereference safe pointer 310.

Safe program 190' contains one safe pointer 310 corresponding to each pointer 210 in preexisting program 190. Each safe pointer 310 points to a single data object 321; and again, there may be several different safe pointers 310 which point to the same data object 321. Generally, in the course of program execution, safe program 190' attempts many accesses to various data objects 321 using various safe pointers 310.

Like pointer 210, safe pointer 310 includes a type field 311 and a *value field 312. Type field 311 specifies the type of data object 321 to which safe pointer 310 refers. Typically, type field 311 would contain a copy of the contents of type field 211. *Value field 312 specifies the memory address of the data object 321 to which safe pointer 310 refers. Typically, *value field 312 would contain a copy of the contents of *value field 212.

In addition, however, safe pointer 310 includes a spatial attribute field 313 and a temporal attribute field 315. Spatial attribute field 313 includes a base type field 313.1 which specifies the data type of the base address, a *base address field 313.2 which specifies the address of the lower bound of the data object 321 to which safe pointer 310 refers and a size field 313.3 which specifies the size of the data object 321 to which safe pointer 310 refers. (NOTE: In languages where pointers are immutable (i.e., may only be derefenced, or assigned to), base type 313.1 and base address field 313.2 are redundant and may be omitted. Even without this information, all spatial access errors can be detected with a range check.) In one embodiment, the type associated with the pointer value in base type field 313.1 is the same as that specified in type field 311.

Temporal attribute field 315 specifies the storage class of the data object 321 to which safe pointer 310 refers. It includes a storage class field 315.1 which specifies the storage class of data object 321 (e.g., Heap, Local, or Global), and a temporal capability field 315.2 which specifies a temporal capability number representative of a capability value associated with the data object 321. When a dynamic variable (data object 321) is created, either through explicit storage allocation (e.g., calls to malloc()) or through procedure invocations (e.g., a procedure call creating a local variable in the stack frame of the procedure), a unique capability is issued to that data object 321, and that unique capability is placed in capability field 315.2 of safe pointer 310 that points to that data object 321. The unique capability is also inserted into an associative store (capability store 350) and then later deleted from that store when the dynamic storage allocation is freed or when the procedure invocation returns (the exact mechanics of this process are discussed in a following section). Thus, the collection of capabilities in capability store 350 represent each active valid data object 321 that has not been deallocated. Temporal access errors occur whenever a reference is made through a stale pointer, (i.e., a pointer which references a data object whose capability is no longer in the capability store). According to the invention, when the program deallocates a data object 321, the unique capability number for that data object 321 is removed from capability store 350; the program need not locate and destroy each stale safe pointer 310 to that data object 321.

In one embodiment, two capabilities are predefined. FOREVER is unique and always exists in the capability store; this capability is assigned to all global objects. NEVER is unique and never exists in the capability store; this capability can be assigned to invalid pointers to ensure any dereference causes an error to be detected.

By monitoring the storage class of a variable, it is possible to detect errant storage deallocations, (e.g., it is illegal to free a global or local variable; only heap variables may be freed). Local objects must be distinguished from heap objects in order to detect errant frees (i.e., illegal frees of local objects). Information distinguishing local variables from heap variables is not completely encoded into the capability field. This distinction is not possible by simply examining the capability field. This is why storage class field 315.1 was added into the temporal attribute 315.

In an alterative embodiment the various storage classes are provided distinct locations in the address space, and the storage class value is derived from the address in the base address field 313.2.

One embodiment of a C-language-like type definition for safe pointer 310 follows:

```
typedef {
    <type>    *value;
    <type>    *base;
    unsigned  size;
    enum {Heap=0, Local, Global} storageClass;
    int capability;   /* plus FOREVER and NEVER */
} SafePtr<type>;
``` where base and size are the spatial attributes, storageClass and capability are the temporal attributes and the type definition is parameterized by <type>, the type of the pointer referent. This <type> could be, e.g., int, float, or any type defined by the language or by the program. In one embodiment of the above C-language-like safe pointer definition, the *value attribute is the only safe pointer 310 member that can be manipulated by the program source; all other members are inaccessible.

A safe pointer 310 can exist in three states: unsafe, invalid, and valid. If the object attributes are incorrect, the pointer has become unsafe and dereferencing this pointer may cause an undetected memory access error. Therefore, it is imperative to ensure that a safe pointer 310 (whether invalid or valid) never becomes unsafe. If a safe pointer 310 is not unsafe, it is either invalid or valid, depending on whether the checking invoked by a dereference would flag an error (an invalid safe pointer 310 will flag an error if it is invoked by a dereference). Programming languages with mutable pointers (e.g., C) allow the program to legally create invalid pointers; for example, a loop iterating a pointer across all the elements of an array exits the loop with the pointer pointing to the memory location following the last element. If the invalid pointer is never dereferenced, the program would not be in error. This behavior illustrates precisely why the preferred embodiment of the invention only places error checking code 340 at dereferences; it is not illegal to have an invalid safe pointer 310— only to use it.

The initial value of a safe pointer 310, if not specified by an initialization expression, must be invalid. This condition ensures that a dereference which occurs before the initial assignment is detected. A simple way to invalidate a safe pointer 310 is to assign the unique capability NEVER to its capability field 315.2.

Figure 4:
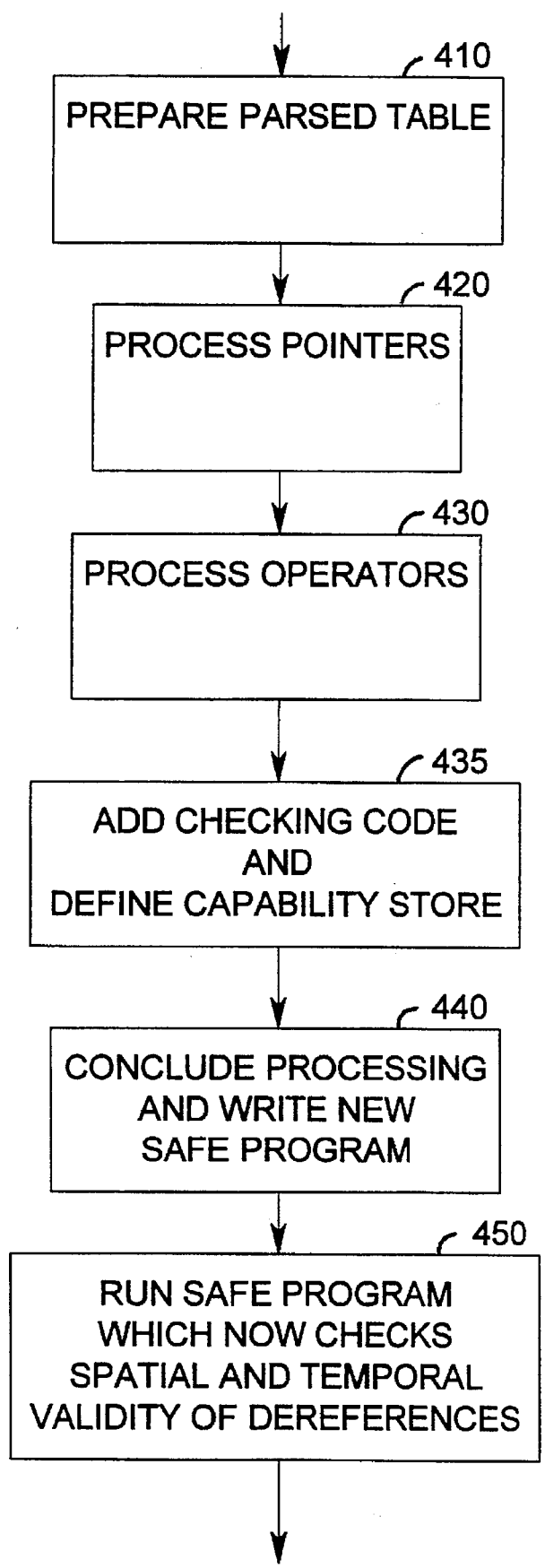
FIG. 4 is a flowchart depicting the overall operation of conversion means 195 of FIG. 1.

FIG. 4 is a high-level flowchart depicting one embodiment of the overall operation of the conversion means 195 of FIG. 1. Creating a safe program from its unsafe counterpart involves three transformations: pointer conversion, operator conversion and check insertion. Pointer conversion extends all pointer definitions and declarations to include space for object attributes. Operator conversion generates and maintains object attributes. Check insertion instruments the program to detect all memory access errors. Accordingly, at 410, a table is prepared containing the parsed preexisting source code program 190. At 420, pointers 210 of preexisting program 190 are replaced with safe pointers 310. At 430, operators 230 of preexisting program 190 are replaced with safe operators 330. At 435, checking code 340 is added which checks dereferences of safe pointers 310 by safe operators 330. In addition, a capability store 350 is defined for use by checking code 340. At 440, the resulting safe program code is written to safe program code file 190'. The safe program code 340 stored in program code file 190' can then be executed at step 450 and spatial and temporal access errors occurring at dereferences of said safe pointers 310 by said safe operators 330 can then be detected.

Pointer Definition

Each pointer definition and declaration from preexisting program 190 must be extended to include spatial attribute 313 and temporal attribute 315 (hereinafter collectively called the object attributes). To make this transformation transparent, the composite safe pointer 310 must mimic the first class value semantics of scalar pointers. (First class values are intrinsic types in a computer language; the operators of the language (e.g., + or *) may be applied to first class values, and their application will create new values of the same type; e.g., numeric types are typically first class values, while composite structures such as C structures are usually not (operations on them must be defined by the programmer).) That is, when passed to a function, the safe pointer 310 must be passed by value (a passing convention for function arguments, where a copy of the argument is passed by the caller to the callee; the callee may then manipulate the passed-by-value argument without affecting the caller's argument), and when a safe operator 330 is applied to a safe pointer 310, the result, if a pointer, must be a new safe pointer 310.

Figure 5:
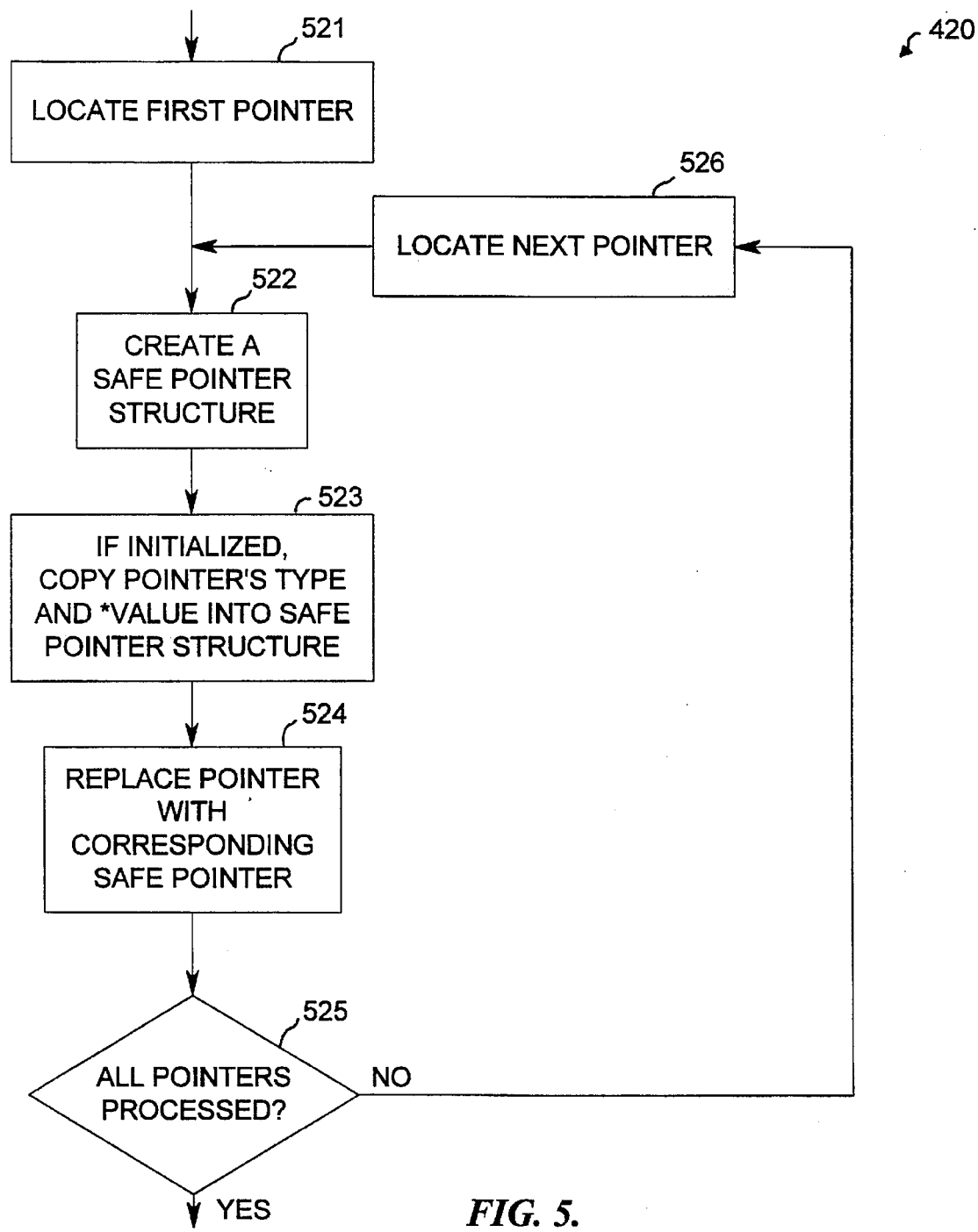
FIG. 5 is a detailed block diagram of the process pointers step 420 of FIG. 4.

FIG. 5 is a detailed flowchart depicting one embodiment of step 420 of FIG. 4. In this embodiment, at 521 the first pointer 210 in the preexisting program 190 is located. At 522, a structure for safe pointer 310 is created which corresponds to pointer 210 of preexisting program 190. If pointer 210 is initialized, at 523 safe pointer type field 311 is loaded with the contents of the type field 211 of pointer 210 of preexisting program 190, and safe pointer *value field 312 is loaded with the contents of the *value field 212 of pointer 210 of preexisting program 190. At 524, pointer 210 is replaced by safe pointer 310.

At 525, the loop is repeated if any unprocessed pointers 210 remain in the preexisting program 190, with step 526 locating the next pointer to be processed.

There is no need to add object attributes to array variables. Array variables (in the C sense) are merely address constants, and thus only exist as statically allocated objects or within structure definitions; as a result, the spatial attributes can be generated from the address constant and its type size, and the temporal attributes can be taken from the safe pointer 310 to the containing object or derived from the array name.

Operator Conversion

Safe operator 330 must interact properly with the composite structure of safe pointer 310. When applied, it must reach into the safe pointer 310 to access the pointer value. If a safe operator 330 creates a new pointer value, that pointer value must include an unmodified copy of the pointer operand's object attributes. (In C there exists one operator with two pointer operands, namely '−', which produces the difference between two pointers. The semantics of this operator imply that the object attributes of both operands should refer to the same data object 321, and so the object attributes from either operand can be copied to the destination safe pointer.) For example, in the C statement q=p+6, the application of the '+' operator on the pointer p creates a new safe pointer 310 which is assigned to q. The new pointer value in q contains a copy of the object attributes from p. A safe operator 330 which manipulates pointer values never modifies the copied object attributes became changing the value of the pointer does not change the attributes of the data object 321 it references. This property holds even for pointers to aggregate structures, in which case, the object attributes refer to the entire aggregate.

Figure 6:
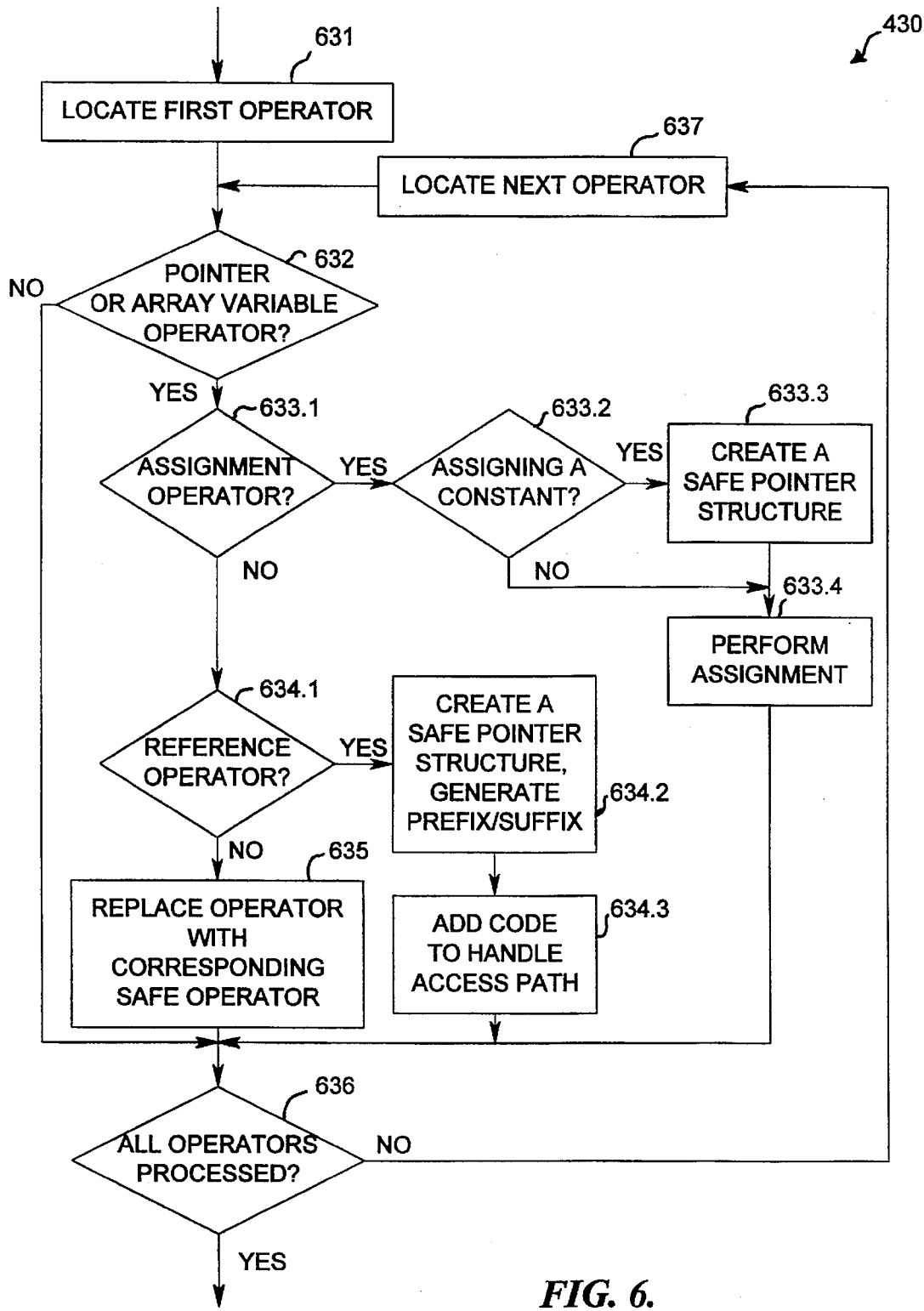
FIG. 6 is a detailed block diagram of the process operators step 430 of FIG. 4.

FIG. 6 is a detailed flowchart depicting one embodiment of step 430 of FIG. 4. In this embodiment, at 631 the first preexisting operator 230 in the preexisting program 190 is located. At 632 conversion means 195 determines whether the located preexisting operator 230 is an operator which operates on pointers. If preexisting operator 230 is not such a pointer operator, control passes to step 636 to check for other operators. At 633.1 conversion means 195 determines whether the located preexisting operator 230 is the assignment operator. If preexisting operator 230 is indeed an assignment operator, control passes to step 633.2. At 633.2 conversion means 195 determines whether the located preexisting assignment operator 230 operates by assigning a constant. If preexisting operator 230 indeed operates by assigning a constant, step 633.3 is performed to create a safe pointer structure 310 and control passes to step 633.4. If preexisting operator 230 does not operate by assigning a constant, control passes to step 633.4. At 633.4 conversion means 195 performs the assignment specified by the located preexisting assignment operator 230, and control passes to step 636.

If at 633.1 conversion means 195 determines preexisting operator 230 is not an assignment operator, control passes to step 634.1. At 634.1 conversion means 195 determines whether the located preexisting operator 230 is a reference operator (a reference operator is a type of operator which creates a pointer to its operand). If preexisting operator 230 is indeed a reference operator, control passes to step 634.2 where a safe pointer structure 310 is created and the access-path prefix and suffix used to define the access path are generated. Control then passes to step 634.3. At 634.3 conversion means 195 adds code which is executed at run time in order to fill in safe pointer structure 310 with data generated from the access path prefix and suffix computed in step 634.2. This process is described in detail below in the explanation of FIG. 10.

If at 634.1 conversion means 195 determines preexisting operator 230 is not a reference operator, step 635 is performed to replace preexisting operator 230 with a corresponding safe operator 330. Control then passes to step 636.

At 636 the loop is repeated if any unprocessed operators 230 remain in the preexisting program 190, with step 637 locating the next operator to be processed.

As summarized in steps 633.1–633.4, the assignment operator requires special handling if the right-hand side is a constant. Two common pointer constants are the NULL value and string constants (for C). If the assignment value is NULL, the NULL value can be replaced by an invalid safe pointer value, e.g., one with the capability NEVER. For string constants, the needed object attributes are generated at compile-time. If the right-hand side of the assignment is a pointer expression, the resulting pointer value (and its object attributes) is copied to the pointer named on the left-hand side of the assignment.

Casting between pointer types does not require any special program transformations. Casting only alerts the compiler that future pointer arithmetic or dereferences of a particular pointer value should be made with respect to the new type size. Casting to a non-pointer type requires that the object attributes be dropped (if only pointers carry object attributes) and then the cast is carried out as defined by the language. Casting from a non-pointer type to a pointer type is problematic if non-pointer types do not carry object attributes. This problem is addressed below.

As summarized in steps 634.1–634.3, handling of the reference operator (e.g., the '&' operator in the C statement q=&p−>b[10]) is slightly more complex as it must generate object attributes. In such a situation, the reference operator is applied to an expression (p−>b[10], in this example) which names some storage. This expression is called the access path. The result of the operation is a new pointer value to the referent named by the expression.

To facilitate conversion, access paths are decomposed into two parts, a prefix and suffix. The access path prefix is always non-empty and describes the sequence of variable names, dereferences, subscripts, field selectors, and pointer expressions leading to the memory object being referenced. It is from this prefix that the temporal attributes are generated. The remaining part of the access path, the access path suffix, is composed of a sequence of field selectors and subscripts (on array variables only). The suffix describes what extent of the object is being referenced. (An extent means the address bounds of a pointer referent to which a dereference is valid; for pointers to composite structures such as arrays the valid extent of a pointer may include many objects.)

Access paths may be further characterized as direct or indirect. A direct access path refers to an object in the global or local space by name. An indirect access path contains at least one pointer traversal, that is, at least one dereference of a pointer in a pointer expression.

Given a reference operator expression, the prefix can be parsed by traversing the expression tree starting with the left-most, lowest-precedence operator. The part of the expression up to but not including the last pointer traversal is the access path prefix, the remaining part of the expression is the access path suffix. If the access path does not contain any pointer traversals, the access path prefix is the name of the referenced variable. Table 1 below shows a number of expressions and their decomposed access paths, where c is an array variable and y is a pointer.

TABLE 1

| Expression | Prefix | Prefix Type | Suffix |
|---|---|---|---|
| a | a | direct | — |
| a.b | a | direct | b |
| a.b.c[4].d | a | direct | b.c[4].d |
| (**p) [3] | **p | indirect | [3] |
| (*p)→b | *p | indirect | b |
| w→x | w | indirect | x |
| w→x→y | w→x | indirect | y |
| w→x→y[3].z→c[4].b | w→x→y[3].z | indirect | c[4].b |

Temporal attributes are derived from the access path prefix. If the prefix is direct, the referenced object is either a global or a local variable. If global, the capability FOREVER is assigned to the capability field 315.2 of the new safe pointer 310. If local, the capability allocated to the local variable's stack frame is copied to the capability field 315.2 of the new safe pointer 310 (frame capability allocation is discussed in the following section). If the access path prefix is indirect, the temporal attributes are copied from the safe pointer 310 named by the access path prefix.

To generate the spatial attribute 313 for the reference, conversion means 195 starts with the spatial attribute of the access path prefix. The access path prefix spatial attribute is either the address and size of the named variable if the access path prefix is direct, or the spatial attribute copied from safe pointer 310 if it is indirect. Using this spatial attribute, the actual base of the reference is computed from the access path suffix, which describes the sub-object being referenced. Since all members of the referenced object (i.e., the members of any contained structure) are of a known size, the offset into the object and its size can be computed at compile time. In the event that the final term of the suffix is a subscript, the spatial attributes are set to the extent of the entire array. This technique allows the safe pointer 310 to be subsequently manipulated to point to other members of the array.

Figure 10:
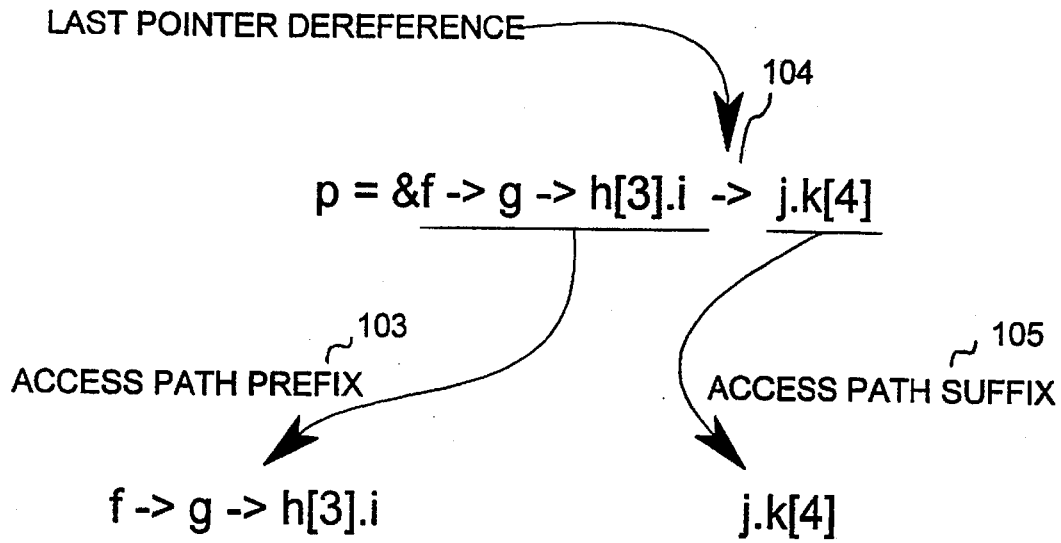
FIG. 10 shows an example of reference operator operand parsing.

FIG. 10 shows an example of an access path, its decomposition into the prefix and suffix, and the C statements required to construct the correct safe pointer value in p. In this example, & is the reference operator, f->g->h[3].i 103 is the access path prefix, j.k[4] 105 is the access path prefix, ->104 is the last pointer dereference; h is a pointer, while k is an array variable. Calculation of base pointer and size demonstrates the widening required if the final term is an array subscript, in that the entire access path to the array is used, rather than just to the fourth element of that array.

Check Insertion

If the safe pointer spatial attribute 313 and temporal attribute 315 are both correct, complete safety for all pointer and array accesses is provided by inserting an access check before each pointer or array dereference. The term "dereference" is used as a blanket term for any indirect access—either through application of the dereference operator (e.g., '*' or '->' in C) or through indexing an array or pointer variable (e.g., '[]' in C).

The following C-language-like code illustrates one embodiment of a memory-access checking function:

```
void ValidateAccess(<type> *addrs {
    if ((storageClass != Global) && !ValidCapability(capability))
        FlagTemporalError( );
    if (((unsigned)addr - (unsigned)base) > (size-
    sizeof(<type>)))
        FlagSpatialError( );
    /* valid access! */
}
```

This function is parameterized by <type>, the type of the safe pointer's referent. FlagTemporalError() performs system-specific handling of a detected temporal access error, (e.g., force a core dump). FlagSpatialError() performs the same function, but for a spatial access error. The function ValidCapability() indicates whether or not the passed capability is currently active (i.e., is in capability store 350).

The dereference check first verifies that the referent is alive by performing a temporal access check including an associative search for the referent's capability. If the referent has been freed, the capability would no longer exist in the capability store 350 and the check would fail. Became capabilities are never re-used, the temporal check fails (i.e., detects the error) even if the storage has been reallocated. If the temporal check succeeds, then the storage is known to be alive, and an address bounds check is applied to verify that the entire extent of the access fits into the address space specified for the referent.

The C-like spatial access check above takes advantage of the wrap-around property of unsigned arithmetic to simplify the address-bounds check. If the accessed address is prior to the start of the array, the unsigned subtraction underflows and creates a very large number, causing the test to fail (i.e., detect the error). The advantage of this expression over traditional address-bounds checks is that it only requires one conditional branch to implement. This simplification reduces the additional control complexity introduced by dereference checks, which can result in better optimization results and better dynamic executions. In another embodiment, a traditional address-bounds check of the form:

((addr<base)|(addr>(base+size-sizeof(<type>))))

may be used. Such an embodiment does, however, requires two conditional branches (or, in the alternative, extra instructions to combine the boolean terms).

Figure 8A:
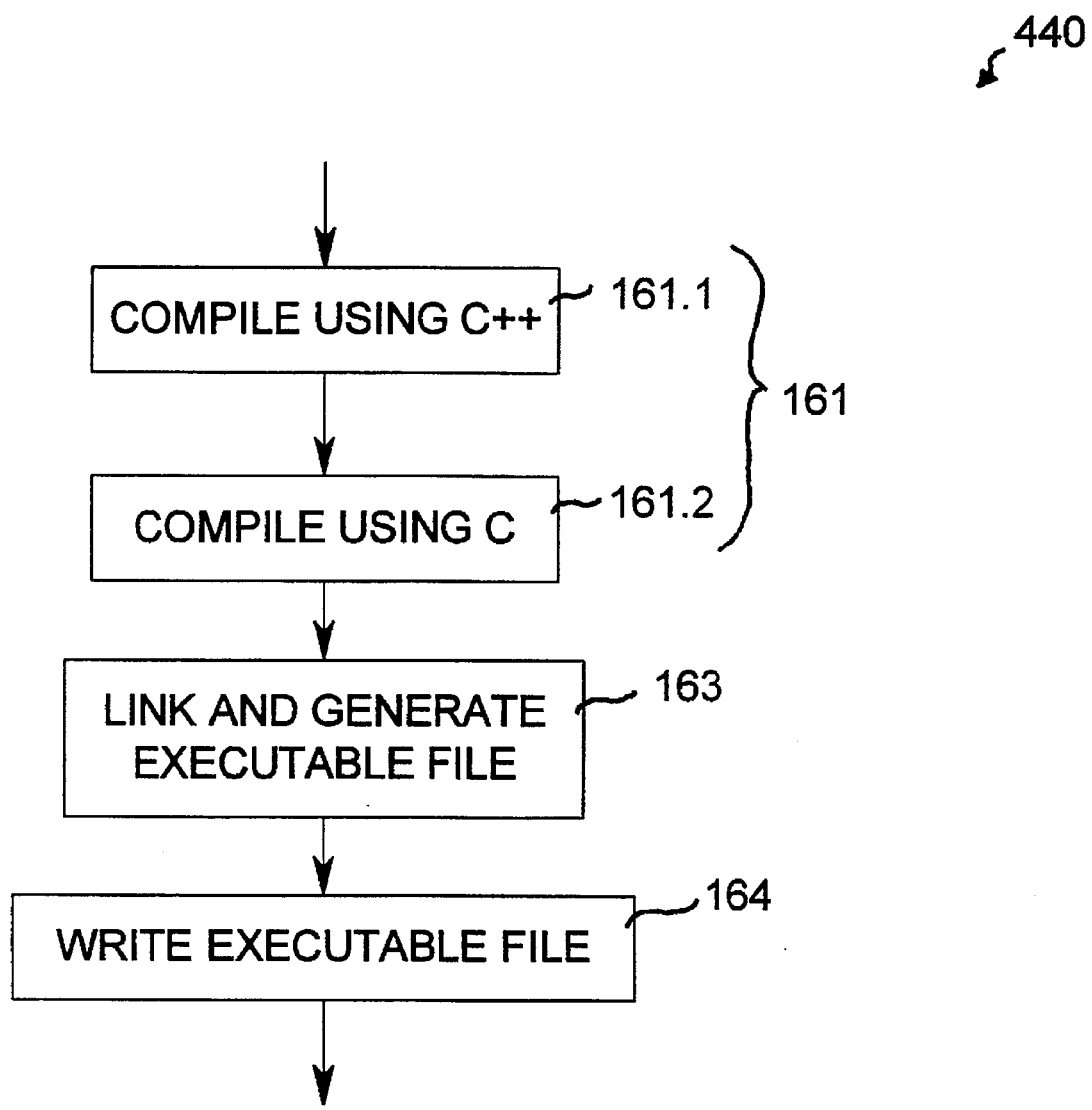
FIG. 8a shows a flowchart of an embodiment of step 440 of FIG. 4.

FIG. 8a is a detailed flowchart depicting the operation of one embodiment of step 440 of FIG. 4. In this embodiment, at 161 safe program source-code file is compiled. Block 161.1 shows the C++ safe program source code being compiled and output as C language code. Block 161.2 shows the resulting C safe program source code being compiled and the results placed in relocatable object files.

At 163 the relocatable object files are linked with library and special safe run-time support to form safe program executable code. This safe run-time support includes extra checking of attempted accesses to detect spatial and temporal access errors. One part of this checking involves converting unsafe versions of malloc() into safe versions, and unsafe versions of free() into safe versions in the manner described above. At 164, the safe program executable code file resulting from steps 161–163 above is written to safe program file 190'.

In another embodiment, the safe pointer conversion is integrated into the compiler used by conversion means 195 and the output 190' is a relocatable object file which is then linked with the other parts of the program. This embodiment allows greater efficiencies because the compiler and conversion means 195 have more information about what the other is doing. It also provides greater safeguards against programmer circumvention of the memory access checking features added by conversion means 195.

Figure 8B:
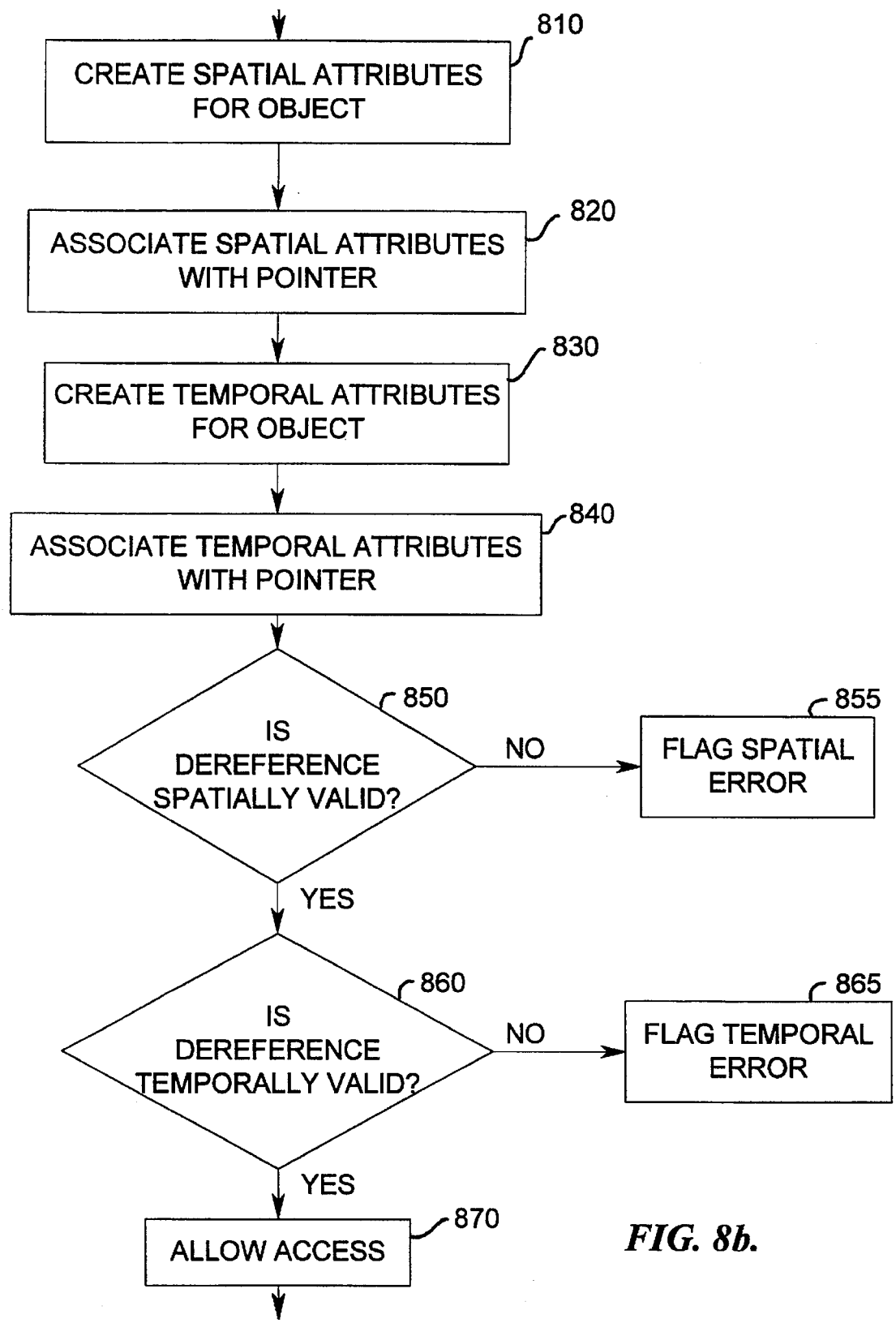
FIG. 8b is a flowchart showing the method used by checking step 450 of FIG. 4.

FIG. 8b is a detailed flowchart depicting execution of the safe program in step 450 of FIG. 4. At 810, spatial attributes 313 for data object 321 are created by the compiler. In one embodiment, spatial attributes include values for base type 313.1, *base pointer 313.2, and size 313.3. At 820, spatial attributes 313 for data object 321 are associated with safe pointer 310. For instance, in the embodiment shown in FIG. 3, step 820 comprises loading values for base type 313.1, *base pointer 313.2, and size 313.3 into their respective fields in safe pointer 310. At 830, temporal attributes 315 for data object 321 are created by the run-time support code. In one embodiment, temporal attributes include storage class 315.1 and capability 315.2. At 840, temporal attributes 315 for data object 321 are associated with safe pointer 310. In the embodiment shown in FIG. 3, step 840 includes loading values for storage class 315.1 and capability 315.2 into their respective fields in safe pointer 310.

When a dereference occurs, a check is made to determine whether the dereference is spatially and temporally valid. Such a determination may be made by checking code 340 called by the execution of a safe operator 330. In such an embodiment, at 850 checking code 340 verifies that the access attempted by the dereference of a safe pointer 310 will be within the address bounds defined by spatial attributes 313. If not, an error notification is made at 855. In one such embodiment, such a spatial access error leads to program termination (e.g. a core dump). In another such embodiment, the error is noted (e.g. posted to the user) and execution continues.

After the spatial validity check of step 850, checking code 340 verifies at 860 that the attempted access is to an object for which a temporal validity number 721 currently exists in capability store 350. If the check fails, an error notification is made at 865. Once again, the error can be handled in any manner, ranging from a warning to a core dump. Control then moves to 870 and the program is allowed to access the data object.

Run-Time Support

The explicit storage allocation mechanism must be extended to create safe pointers. During allocation, a capability must be allocated for the storage, and any contained pointers must be invalidated. At deallocation, the capability given to the storage must be destroyed.

FIG. 11 shows how this support would be provided for malloc(), the storage allocator provided under UNIX InsertCapability(), ValidCapability(), and DestroyCapability() are insert, locate, and delete capabilities, respectively which maintain capability store 350. bzero() clears size bytes of memory starting at p.value. bcopy() copies min(size, p.size) bytes of storage from p.base to new.base. FlagDuplicateFree() is a system-specific function which flags an error indicating that the program attempted to free a previously heed heap allocation. FlagNonHeapFree() flags an error indicating that the program attempted to free memory that is not in the heap. FlagNonOriginalFree() flags an error indicating that the program attempted to free memory without using a pointer to the head of the allocation. NextCapability() returns the next unique capability. unsafe_malloc() and unsafe_free() are interfaces to the system-defined storage allocator.

During allocation, malloc() generates a safe pointer 310 using the size and location of the allocation request. The call to NextCapability() returns the next available and unused capability. In this embodiment, NextCapability() is implemented with an incrementing counter. (An alternative embodiment uses a pseudo-random number generator (a number generator which generates a sequence of N random numbers without duplication within the sequence). This has the advantage of helping to thwart a programmer who might try to generate a counterfeit pointer.) The capability is inserted into capability store 350 via the call to InsertCapability(). The call to bzero() clears the entire storage allocation. This action ensures that any pointers in the untyped allocation are initially invalid (this embodiment provides that the storage class of Heap and capability NEVER are both assigned the value of 0).

Function calloc() in FIG. 11 simply calls malloc() as in either case the storage is cleared before it is returned.

The implementation of realloc() in FIG. 11 is slightly more subtle. This function takes an existing storage allocation and resizes it to the requested size. The reallocated storage may move for any request, either large or smaller. If moved, the contents of the new allocation will be unchanged up to the lesser of the new and old sizes. In a safe programming environment, the storage must be moved in all cases, otherwise, there may exist a safe pointer 310 (which cannot be located and changed, because nothing connects an object back to each of the possibly many copies of the pointer that points to it) whose spatial attribute 313 has an incorrect record of the referent size. If dereferenced, this pointer may flag errors even though the access was valid in the reallocated storage, or worse, the reallocation may have shrunk the referent, creating unsafe pointers whose referent sizes are too large. Both these problems are solved by always moving the storage. This action will force the program to update any old pointers to the previous allocation. Because the reallocated storage is allocated under a new capability, any stale pointers to the previous allocation will flag errors if dereferenced. The remaining storage in the reallocation need not be cleared if the reallocated storage is larger than the original storage, as the safe call to malloc() returns cleared storage.

At calls to free(), the capability of the allocation (contained in the safe pointer temporal attribute 315) is deleted from the capability store 350 by the call to DestroyCapability(). This embodiment also verifies that the freed storage is indeed a heap allocation and a pointer to the head of the allocation (as this condition is required by free()).

The same allocation mechanism is applied to the dynamic storage allocated in procedure stack frames. When a function is invoked, a capability must be allocated for the entire frame if it contains any referenced locals. Any pointers contained in the frame must be set to an invalid state. The steps taken to apply the frame allocation mechanism to a function is illustrated in FIG. 12.

FIG. 12 shows how a C function is modified to include a capability assignment for each frame. In FIG. 12, a procedure prologue is inserted before the function-specific code in order to define a frame capability. In the code fragment shown, InsertCapability() inserts a capability into the capability store and ZeroFramePointers() ensures that any pointers in the procedure stack frame are initially invalid by clearing the frame storage (ZeroFramePointers() serves the same purpose as the call to bzero() in malloc(); it is a system-specific function which clears all pointers in the newly allocated stack frame). In a system where stack-frame allocations are strongly typed, ZeroFramePointers() can be implemented as a function which simply makes NULL assignments to all the frame pointers. DestroyCapability() deletes a capability from the capability store. NextCapability() returns the next unique capability.

If the language supports non-local jumps (e.g., longjmp() in C), the run-time support mast delete the frame capabilities of any elided function frames. This operation can be simply and portably implemented if the local capability space and heap capability space are kept disjoint, and function frame capabilities are allocated using an incrementing counter. The allocation of frame capabilities then becomes a depth-first numbering {Dragon:86} of the dynamic call graph. When a non-local jump occurs, all elided frame capabilities between the source frame and destination frame are deleted by removing all frame capabilities in the capability store that are larger than the frame capability of the destination frame. This mechanism only works if the source and destination frames are on the same call stack—this stipulation may not be true in all cases (e.g., coroutine jumps).

Capability Store

In one embodiment, capability store 350 is an associative memory containing the capabilities of all active memory. It is implemented as a hash table with the capability as the hash key. Accesses to capability store 350 exhibit a great deal of temporal locality, so moving accessed elements to the head of the hash table bucket chains is likely to decrease average access time.

Figure 7:
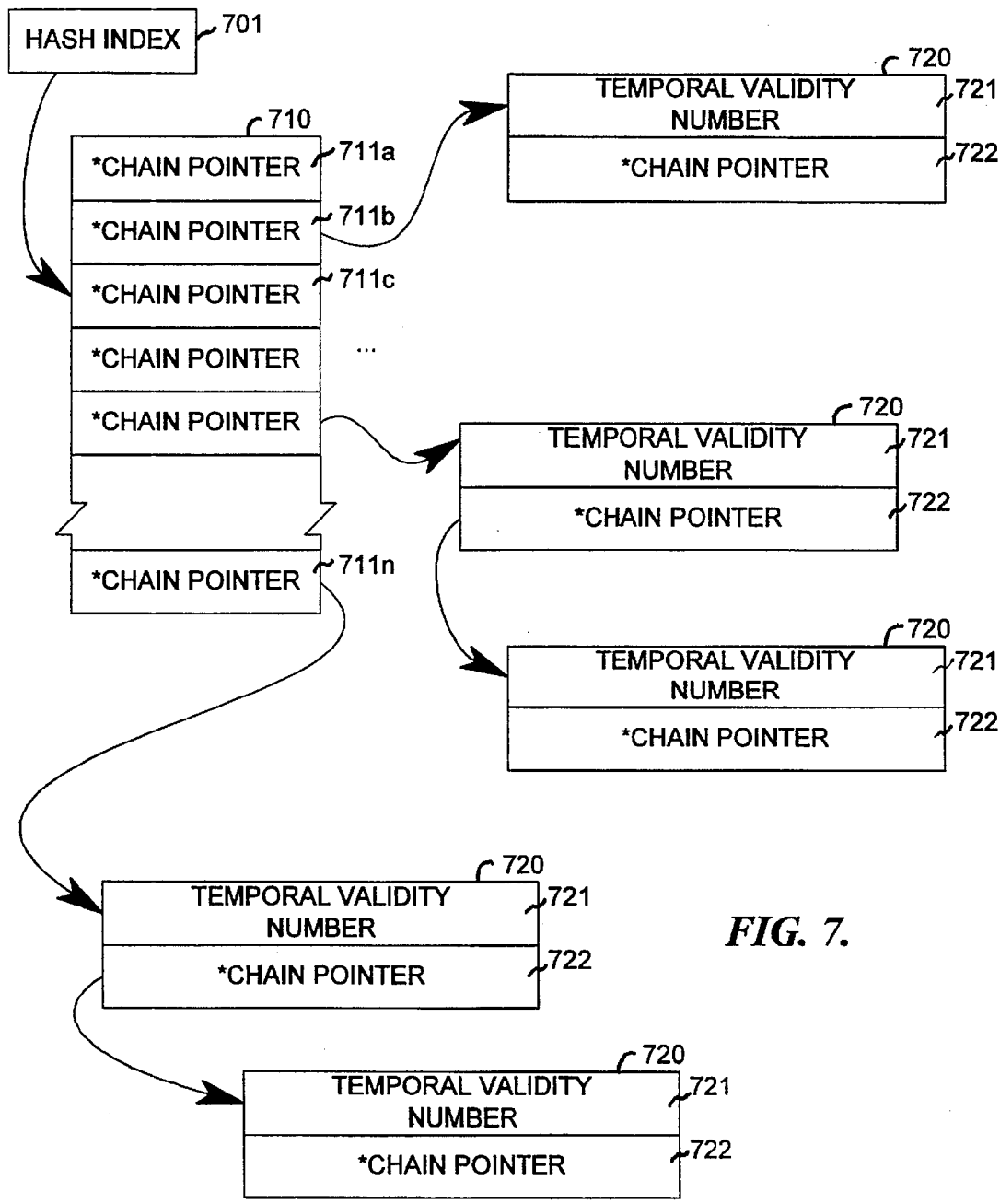
FIG. 7 is a detailed block diagram depicting the capability store 350 of FIG. 3.

FIG. 7 is a block diagram of a hash table implementation of capability store 350. In FIG. 7, hash index table 710 is a table of pointers to capability store table elements 720. In one embodiment, hash index table 710 contains 1024 entries. Hash index 701 is an index into hash index table 710. Hash index 701 is derived from a capability number that checking code 340 requests a search for in capability store 350. In this embodiment, hash index 701 is calculated by shifting said capability number right 16 bits, exclusive-ORing the result with the original said capability number, and then masking that result to leave only the low-order 10 bits, which is then used to select one of the 1024 entries in hash index table 710.

Chain pointers 711a–711n each point to the head element in a chain of capability store table elements 720. In one embodiment, capability store 350 contains up to 1024 chains of capability store table elements 720. The capability number for every capability store table element 720 on a particular chain will have the same value for its hash index 701. Thus by searching down this chain, one can find this capability if it exists in capability store 350. A *chain pointer 711 with a value NULL indicates that no capability store table elements 720 are chained to this chain pointer 711 (that is, that there are no entries on the chain of capability store table elements 720 for this hash index 701).

Each capability store table element 720 comprises a temporal validity number 721 and a *chain pointer 722. A *chain pointer 722 with a value NULL indicates that no more capability store table elements 720 are chained to this capability store table element 720 (that this element is the end-of-chain).

Figure 9:
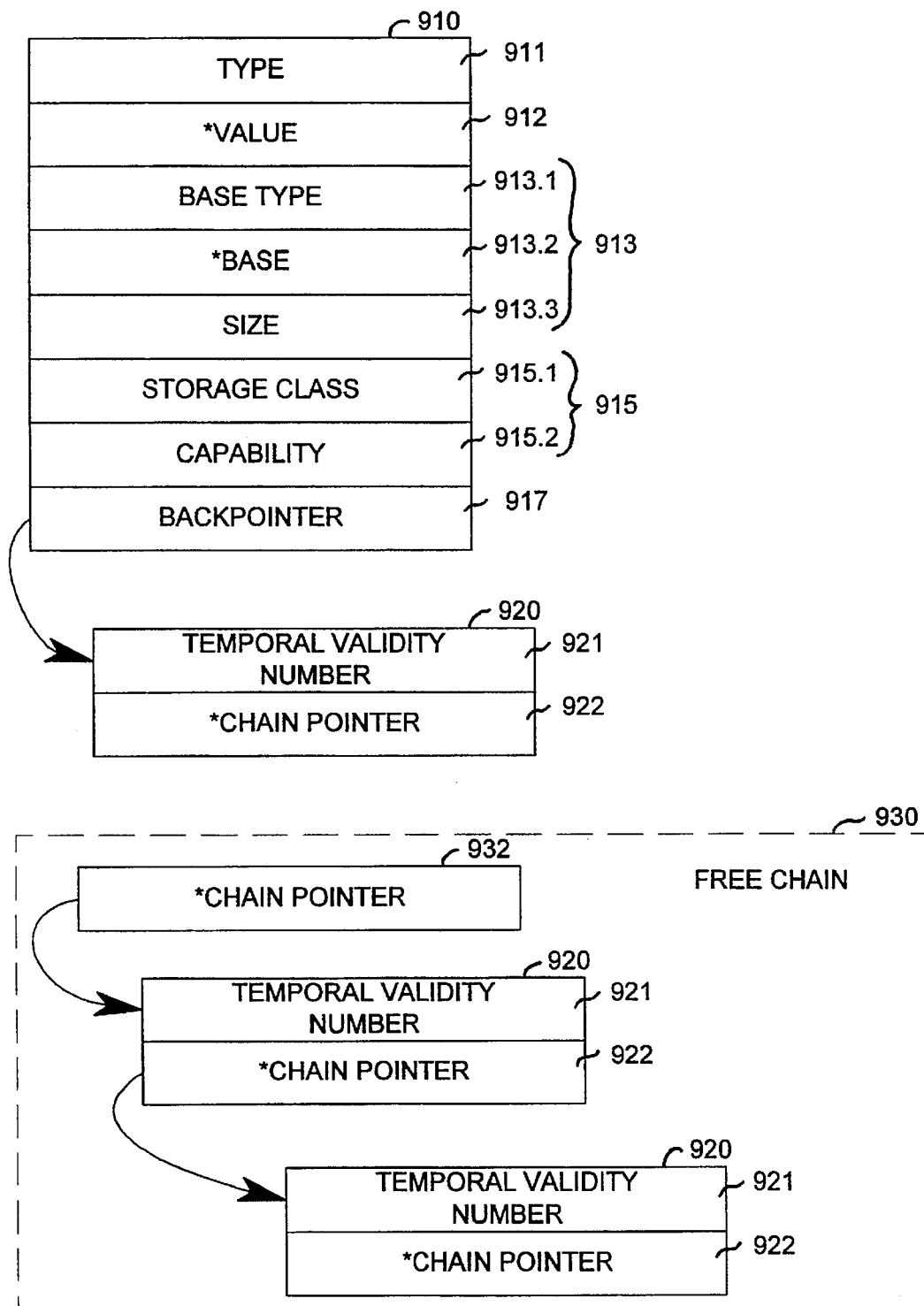
FIG. 9 details an alternative embodiment of the capability store 350 and its associated maintenance functions.

FIG. 9 is a block diagram depicting an alternative embodiment of safe pointer 310 of FIG. 3, and capability store 350 of FIG. 7. In FIG. 9, safe pointer 910 is the alternative embodiment for safe pointer 310 of FIG. 3. Type field 911 specifies the type of data object 321 to which safe pointer 910 refers. Type field 911 would contain a copy of the contents of type field 211. *Value field 912 specifies the memory address of the data object 321 to which safe pointer 910 refers. *Value field 912 would contain a copy of the contents of *value field 212. Spatial attributes 913 contains the spatial attributes for the data object 321 pointed to by safe pointer 910. Base type 913.1 specifies the type of the data object 321 to which safe pointer 910 points. The type associated with the pointer value in *base field 913.1 is generally identical to that specified in type field 911, and need not be included for computer programming languages which do not require specification of a type for *base field 913.2. *Base field 913.2 specifies the address of the lower bound of the data object 321 to which safe pointer 910 refers. Size field 913.3 specifies the size of the data object 321 to which safe pointer 910 refers.

Temporal attributes 915 specify the temporal attributes used to check accesses to data object 321. Storage class field 915.1 specifies the storage class of the data object 321 to which safe pointer 910 refers. Capability field 915.2 specifies a capability value associated with the data object 321 to which safe pointer 910 refers. Backpointer 917 comprises a pointer to a single capability store element 920 which specifies the capability of the data object 321 to which safe pointer 910 points. Free element list 930 is a list of free capability-store elements 920. Chain pointer 932 points to the head element in a chain of free capability store table elements 920. In this embodiment, free element list 930 will be checked when the safe program 190' needs a capability-store element 920, and if none are found, then 1024 capability store elements 920 are created and linked to chain pointer 932.

Capability store elements 920 each comprise a temporal validity number 921 corresponding to the current temporal validity of the data object 321 associated with this capability store element 920, and a chain pointer 922 used to chain this capability store element 920 when it is on the free element list 930.

In this embodiment, a temporal validity check comprises comparing temporal validity number 921 (accessed using backpointer 917) to the value in safe pointer capability 915.2. If temporal validity number 921 matches safe pointer capability 915.2, then the access is allowed; otherwise an error is flagged. Any form of matching could be used and fall within the scope of this invention. For instance, an error could be flagged if temporal validity number 921 does not equal the value in safe pointer capability 915.2, if temporal validity number 921 does not equal the negative of the value in safe pointer capability 915.2 or any other matching mechanism available to one skilled in the art of computer programming.

When dynamic storage data object 321 is deallocated, its capability store element 920 is reclaimed by destroying its temporal validity number 921 (in one embodiment, by assigning predefined capability NEVER to it) and chaining it to the top of free list 930. Since safe pointers 910 may still access the storage location that once held a capability store element 920 (e.g., an errant reference such as a reference to a deallocated data object 321), any storage which holds a capability store element 920 must never be used for any other purpose.

Implications of Complete Error Coverage

The above safe programming technique can detect all memory access errors provided that the following qualifications hold:

a) storage management must be apparent to the translator;

b) the referents of all pointer constants must have a known location, size, and lifetime; and c) the program must not manipulate the object attributes of any pointer value.

Error coverage is limited to storage management controlled by the safe programming run-time system. If a program implements a domain specific allocator at the user level, some memory access errors, as viewed by the programmer, can be missed.

Consider, for example, a fixed-size storage allocator. If a program relies heavily on a fixed size structure, storage requirements and allocation overheads can be greatly reduced by applying a fixed-size allocation strategy. At the program level, the fixed-size allocator calls the system allocator (e.g., malloc() or sbrk() in the C language) to allocate a large memory allocation. The fixed-size allocator then slices the memory allocated into fixed-size pieces with a zero overhead for each allocation. Under such a scheme, the safe programming techniques described above can only be used to ensure that accesses to one of these memory slices is within the overall memory allocated. There is no mechanism for interslice verification. This imprecision occurs because the translator can not disambiguate the user level storage allocation actions from other pointer related program activities.

With some programmer intervention this problem can be solved. Any useful safe compiler implementation has to include an application programmers interface, or API, through which systems programmers can construct and manipulate spatial attribute 313 and temporal attribute 315 of safe pointer 310. In the case of the fixed-size storage allocator, the programmer would specify the base and size of the fixed-size allocation for spatial attribute 313. Storage class 315.1 and capability 315.2 of a new safe pointer 310 are generated from the safe pointer 310 that points to the block from which the fixed-size allocation was derived.

Without the qualification listed in b) above, the compiler may not be able to generate correct object attributes for a pointer constant. For example, device driver code typically creates pointers to device buffers and registers by recasting an integer to a pointer value. The translator has no way of knowing the size and lifetime of the referent; thus, program safety cannot be maintained. In C, the only well-defined pointer constants are NULL, strings, and functions. For all other cases, this problem can be avoided by supplying the programmer with an API suitable for specifying the size and lifetime of problematic pointer constants.

(There are two ways functions can be integrated into a safe programming framework. If one assumes that function pointers can only be assigned and dereferenced, they will not intermix with safe pointers and may remain simple pointers. Then, the only check required at dereferences is a non-NULL check. If cast operators may be applied to function pointers, they can be represented by a safe pointer 310 with a storage class of "Function" (e.g., storageClass 315.1 is assigned "Function"). Then, at dereferences of function pointers, the checking code must ensure the pointer value is a function pointer and has not been changed (e.g., storageClass 315.1=="Function", and value 313.2==base 312); at non-function pointer dereferences, the storage class 315.1 of the safe pointer 310 must be checked to see that it is not a function pointer (e.g., storageClass 315.11 !="Function").)

Qualification b) does not, however, preclude the use of recasts from non-pointer variables to pointer variables. To successfully support these operations, object attributes must be attached to all variables. In general, to provide complete safety, object attributes must be attached to any storage that could hold a pointer value. It should be noted, however, that most "well behaved" programs will only require pointer variables to carry object attributes.

Finally, a requirement that the safe program must not manipulate the object attributes of any pointer value protects these object attributes. If a program can arbitrarily manipulate the object attributes of a pointer value, then safety can always be subverted. For example, changing the storage class of a pointer from Global to Heap and then freeing the pointer would likely cause disastrous effects under the above-described storage allocation scheme, and these effects would not be detected by the described safe programming framework.

In the safe programming technique described above, object attributes attach only to pointer values. In such a scheme, the danger exists that pointer values will be manipulated through the use of recasts or unions. With a recast, it is possible to type storage in the referent first as a non-pointer value, manipulate the storage arbitrarily, and then recast the referent storage to a (possibly unsafe) pointer. With a union, it is possible to create a pointer value under one field and then manipulate the object attributes of the pointer value through another overlaid, non-pointer field of the union.

One way to prevent this kind of manipulation is to attach object attributes to each byte of allocated storage. In one such embodiment of the present invention, object attributes are assigned to each byte of allocated storage. For types larger than one byte, the object attributes are copied to all other storage holding the allocation. In this way, the object attributes are not prone to be manipulated at the program level.

In reality, for "well behaved" programs a high margin of safety can be provided by attaching object attributes only to pointer values. A well-behaved program is one in which pointer values are never created from or manipulated as non-pointer values. In one embodiment of the present invention, if a program violates this rule (e.g., through a recast), a safe compiler operating within conversion means 195 makes a conservative approximation as to the intended referent of the new pointer value. If the intended referent determined by conversion means 195 is within an area of live storage, access is allowed to proceed. Note that in such an embodiment, since the program may have manipulated the pointer value to point before or after the intended referent prior to recasting it to a non-pointer value, the new pointer value cannot be bound to a live variable. Conversion means 195 should, in any case, generate a warning message to prevent unintentionally (e.g., through incorrect use of a union) manipulation of pointer values.

Optimizing Dereference Checks

In the interest of performance, it may be possible to elide (skip) dereference checks and still provide complete program safety. If a dereference of pointer value v has not been invalidated by some program action, a subsequent, equivalent check may be skipped.

This check optimization can be implemented either at run-time or at compile-time. Run-time check optimization has the advantage of being more flexible. Only the checks absolutely required to maintain program safety need be executed. However, the cost for this precision is to keep extra safe pointer state information which must copied, maintained, and checked at each dereference. Compile-time check optimization, on the other hand, is less flexible because the safe program 190' must constrain the decision to elide a check to all previous possible executions leading to a program point. The advantage of compile-time check optimization is that no additional overhead is required at run-time to determine if a check may be elided.

Run-Time Check Optimization

A framework for dynamically eliding spatial and temporal checks has been designed and implemented. Spatial checks have no side effects, thus "memoization" {Field:88} (or function caching) can be employed to elide their evaluation.

Figure 16:
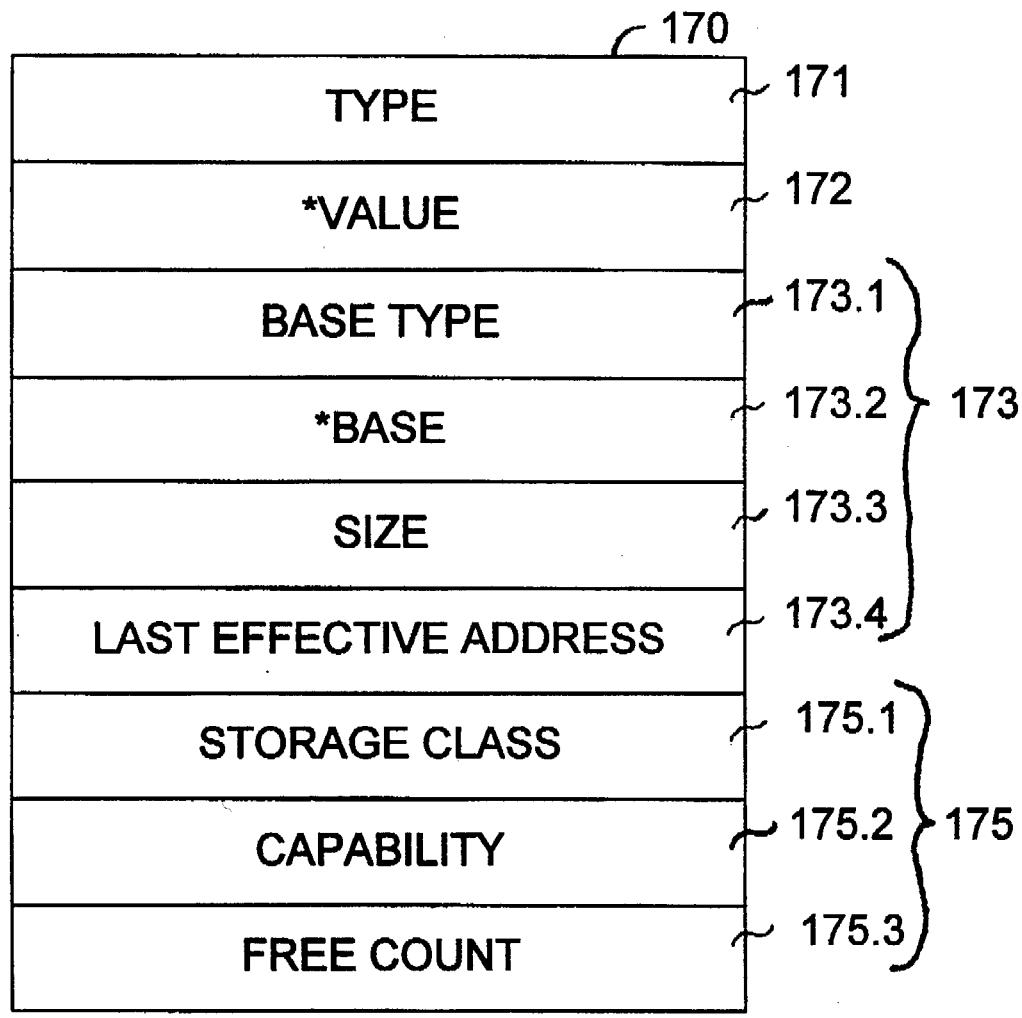
FIG. 16 details an alternative embodiment if safe pointer 310 which facilitates optimization of the run-time execution.

FIG. 16 depicts an alternative embodiment of safe pointer 310 of FIG. 3. Like pointer 310, safe pointer 170 includes a type field 171 and a *value field 172. Type field 171 specifies the type of data object 321 to which safe pointer 170 refers. *Value field 172 specifies the memory address of the data object 321 to which safe pointer 170 refers. Like safe pointer 310, safe pointer 170 includes a spatial attribute field 173 and a temporal attribute field 175. Like spatial attribute field 313, spatial attribute field 173 includes a base type field 173.1, a *base address field 173.2 which specifies the address of the lower bound of the data object 321 to which safe pointer 170 refers and a size field 173.3 which specifies the size of the data object 321 to which safe pointer 310 refers. However, safe pointer 170 also contains last address field 173.4 containing a copy of the effective address of the last dereference of this safe pointer 170.

Like temporal attribute field 315, temporal attribute field 175 specifies the storage class of the data object 321 to which safe pointer 170 refers. Like temporal attribute field 175, temporal attribute field 175 includes a storage class field 175.1 which specifies the storage class of data object 321 (e.g., Heap, Local, or Global), and a temporal capability field 175.2 which specifies a temporal capability number representative of a capability value associated with the data object 321. In addition, temporal attribute field 175 contains free count field 175.3 which contains a copy of the global free counter 179. In this embodiment, the safe program 190' contains one global free counter 179 which is incremented each time a free() function is called to deallocate memory (i.e. to deallocate a data object 321 from the heap). In one embodiment, the safe free() function increments the global free counter 179 each time it destroys a capability (a capability is destroyed by invalidating a temporal validity number 721 in a capability store table element 720). Each time a memory access is made using pointer 310, its free count field 175.3 is loaded with a copy of the current value in global free counter 179. The next access using safe pointer 170 compares the value in global free counter 179 with the value in free count field 175.3 of safe pointer 170; if the values are the same, the safe program 190' can assume that the value in capability field 175.2 is still valid.

In an alternative embodiment comprises a separate global free counter 179 exists for each type of object which can be specified by storage class field 175.1. This embodiment improves the efficiency of the optimization scheme by reducing the number of events which will cause the global free counter 179 for a particular type of object to be incremented.)

At any dereference, the spatial check may be elided (skipped) if the effective address of this dereference is the same as the value stored in last address field 173.4. This test is shown in FIG. 15 in the if statement surrounding the address-bounds check. (In an alternative embodiment (not shown), it may be useful to "memoize" more than one set of last-effective-address operands. In yet another alternative embodiment (not shown), both the effective address of the last dereference (i.e., use of '*'), and the effective address of the last subscript operation (i.e., use of '[]') are memorized. Changes in the former are tracked with a single "dirty" bit. Changes in the latter are tracked by retaining a copy of the last index applied to the pointer value.)

The C-like function of FIG. 15 is parameterized by <type> which is the type of safe pointer referent 321. In FIG. 15, FlagTemporalError() performs system-specific handling of a temporal access error, e.g., to force a core dump. FlagSpatialError() performs the corresponding function for a spatial access error. The function ValidCapability() indicates whether or not the passed capability is currently active, i.e., is in the capability store 350. The variable currentFreeCount is a global counter incremented each time storage is deallocated.

To elide temporal checks, a copy of a global counter, incremented when storage is deallocated, is kept in safe pointer 310. If this counter, which is called the free counter, has not changed since the last temporal check, the referent has not been freed and the temporal check can be safely skipped. In one embodiment, the free counter does not increment when a procedure returns. Rather, the checking code always performs temporal checks on pointers to local variables. This strategy works very well in practice became procedure returns are quite frequent, while the use of local referents is generally infrequent. In an alternative embodiment two counters are used: a free counter for use with heap objects, and a return counter for use with the local objects of function call returns.

Compile-Time Check Optimization

A compile-time optimization framework embodiment will be described next. This embodiment's algorithm implements a forward data-flow framework similar to that used by common subexpression elimination {Dragon:86}. In this embodiment, because of the simplified address-bounds check, there is no need to split the optimization into upper-bounds-check and lower-bounds-check elimination. A flow graph of this compile-time check optimization algorithm embodiment follows:

---

Input:   A flow graph G with blocks B with gen[$B_i$] and kill[$B_i$] computed for each block $B_i \in B$. gen[$B_i$] is the set of check expressions generated in $B_i$. kill[$B_i$] is the set of check expressions killed in $B_i$. The entry block is $B_1$.
Output:  A flow graph G with redundant checks deleted.
Method:  The following procedure is executed twice, once for spatial check optimization and again for temporal check optimization.
/* initialize out sets */
    in[$B_1$] = ∅;
    out[$B_1$] = gen[$B_1$];
    U = ∪  gen[$B_i$];
         $B_i \forall B$
    for $B_i \in B - B_1$ do
        out[$B_i$] = U - kill[$B_i$];
/* compute availability of checks, in sets */
    change = true;
    while change do begin
        change = false;
        for $B \in B - B_1$ do begin
            in[$B_i$] =  ∩     out[P];
                     P ∈ Pred[B]
            oldout = out[$B_i$];
            out[$B_i$] = gen[$B_i$] ∪ (in[$B_i$] - kill[$B_i$]);
            if out[$B_i$] ≠ oldout then
                change = true;
        end
    end
/* elide redundant checks */
    for $B_i \in B - B_1$ do begin
        for c ∈ gen[$B_i$] do begin
            if c   in[$B_i$] then
                elide check c;
        end
    end

---

An embodiment of the optimization algorithm is shown in the above flow graph. The algorithm is run twice, once for optimization of spatial checks and again for temporal checks. The algorithm executes in three phases.

In the fast phase, the algorithm seeds the data-flow analysis by approximating all out sets. For all blocks except the entry block, the value of out[$B_i$] is set to all check expressions less those killed by the block $B_i$, i.e., U–kill[$B_i$]. For the program entry block, $B_i$, this embodiment must assume that no checks are available, hence, in[$B_i$] is set to empty and out[$B_i$] is set to the checks generated in the entry block $B_i$.

In the second phase, the data-flow framework is solved to determine where check expressions reach in the program. For a check expression to reach a node $B_i$, it must be available at $B_i$ for all executions, that is, it must be available in the out sets of all predecessors to block B . This requirement is precisely why the confluence operator is intersection. After the data-flow computation converges on a solution, i.e., change=false, the set in[$B_i$] contains all checks that reach block $B_i$.

In the third phase, the in sets are used to elide redundant checks. Checks may be elided wherever a lexically identical (or equivalent, if value numbering {Rosen:88} or equality tests {Alpem:88} are applied) check is available in the block (i.e., the same check is in the in set of the block).

The defining feature for each analysis (spatial and temporal) is the specification of what constitutes a kill. A spatial check is killed by any assignment to a check operand, which includes assignment to the pointer variable or any of the operands of the index expression (if the pointer was indexed in the check expression). A temporal check is killed by any free of the referent storage. If the referent of a free can be determined to be different than the check referent (e.g., through alias analysis), the free need not kill the check.

While performing these analyses, the algorithm must also be wary of kills that may occur through function calls or aliases. In either case, a conservative approximation must be made if insufficient information is available and assume that a kill does occur.

Experimental Evaluation

The invention's safe programming methodology was evaluated by implementing a semi-automatic source-to-source translator and examining the run-time, code and data size overheads for six non-trivial programs. For each program, performance was analyzed both without optimization and with run-time resolved optimizations. Lower bound statistics for the efficacy of compile-time optimization were also generated through the use of a trace analyzer.

Experimental Framework

Figure 17:
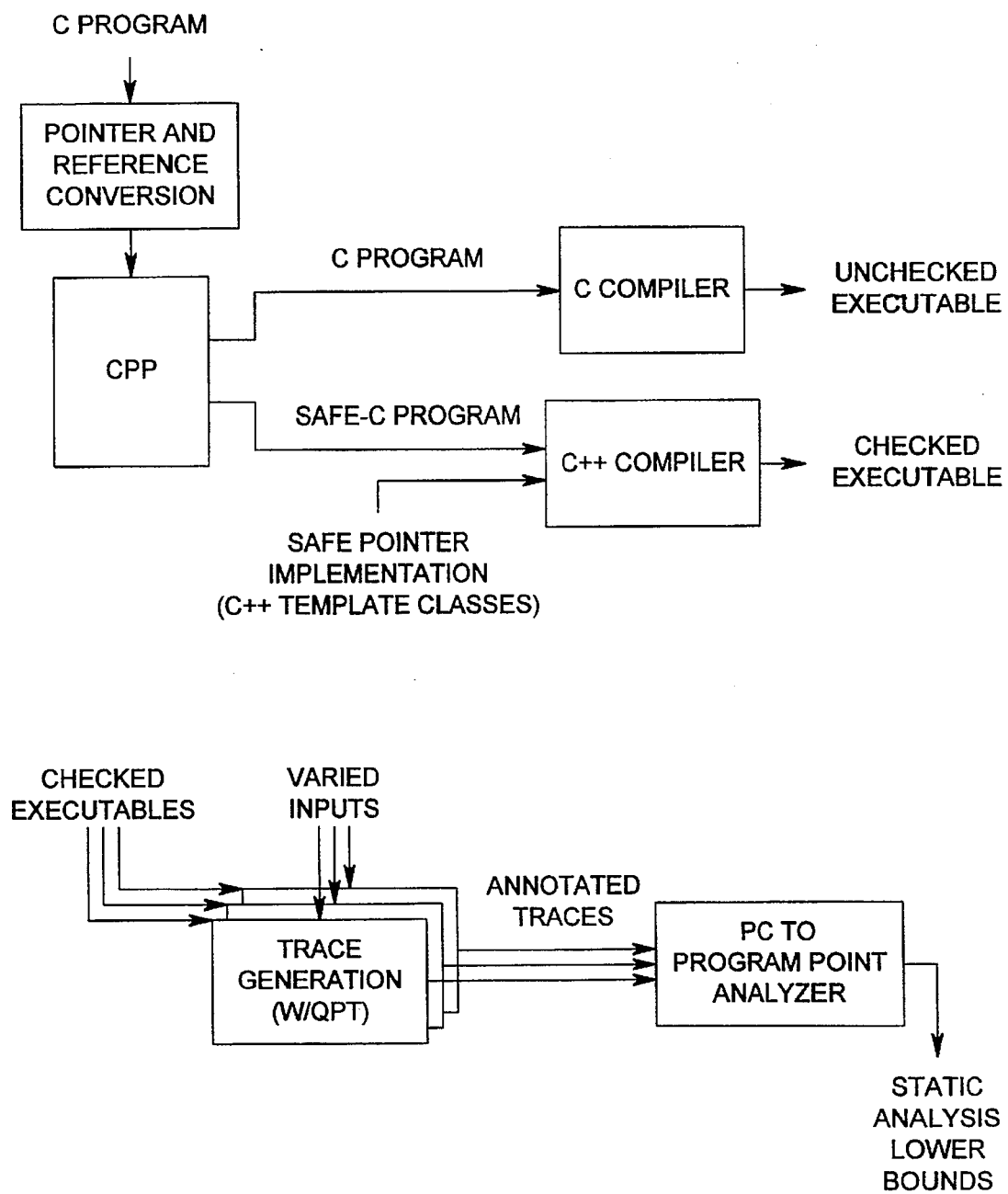
FIG. 17 is a table showing programs which were measured while using the invention.

FIG. 17 shows the experimental framework. C programs are translated to their safe counterparts by first rewriting all pointer and array declarations, calls to malloc() and free(), and references (use of the '&' operator) to use the Safe-C macros. These macros, when passed through the C preprocessor ("CPP"), produce either the original C program or a Safe-C program. A Safe-C program has all pointer and array declarations changed to type parameterized C++ class declarations. Using operator overloading in the C++ class definition, the extended safe pointer and array semantics are implemented as described above.

The following code shows a portion of an unoptimized safe pointer implementation:

```
template <class Type>
class sp {    /* safe pointer representation */
    Type *value;        /* native pointer */
    Type *base;         /* base address of object */
    unsigned long size; /* size of object in bytes */
    char storageClass;  /* type of allocation */
    unsigned short capability;/* capability is always unique */
    /* constructor */
    sp(void) {
        value = NULL;
        base = NULL;
        size = 0;
        storageClass = None;
        capability = NEVER;
    }
    /* dereference */
    Type& operator*(void) {
        if ((storageClass != Global) &&
                !ValidCapability(capability))
            FlagTemporalError( );
        if (((unsigned)value – (unsigned)base) >
                (size–sizeof(Type)))
            FlagSpatialError( );
        return *value;
    }
    /* pointer addition */
    sp<Type> operator+(int addend) {
        sp<Type> p = *this;      /* no side-effect on "*this" */
        p.value = p.value + addend;
        return p;
    }
    /* pointer boolean equality test */
    int operator==(sp<Type>& p) {
        return value == p.value;
    }
}
```

In the embodiment tested, all explicit storage allocation, i.e., calls to malloc() and free(), called wrapper functions which create safe pointers from the standard library routines. The safe malloc() implementation clears all allocated storage, so any contained pointers start in the invalid state. If a local object in a function is used as a pointer referent the function was rewritten to allocate a capability for the frame in the manner described above. Any pointer in the stack frame of the function was initialized to an invalid state in the constructor of the C++ safe pointer class and assigned object attributes generated from the decomposed access path.

In evaluating performance, a lower bound on the number of checks required was computed for compile-time optimization by modifying the safe pointer implementation to make superfluous stores to a global scratch pad array during dereferences. The location of the superfluous stores indicated whether or not a particular program point required a check at run-time. The run-time-resolved optimization scheme described above was used to determine if a check was required at run-time. The superfluous stores were tracked by an address trace analyzer which tabulated, by address, how many checks were executed. When the program terminated, the total number of program points that did not execute any checks were computed, as were the total number of dynamic checks elided at these program points.

These results form a lower bound on the number of static (in the code) and dynamic (executed at run-time) checks required for a compile-time optimized program. With true compile-time analysis, the actual number of checks required may be higher because 1) other inputs may require checks at program points that did not execute any checks, and 2) limitations in static analysis, e.g., imprecisions due to program aliases, may force a compile-time optimizer to make conservative assumptions and add checks where they may not be needed. To increase the effectiveness of the lower bound study, the results of four separate inputs were combined.

The lower bound results are not a strict lower bound. Other static analysis techniques, e.g., range analysis {Harrison:77} or program restructuring, could decrease the number of static checks required. However, for the proposed compile-time optimization framework without program restructuring, the lower bound results are a strict lower bound.

Analyzed Programs

Six programs, selected became each exhibits a high frequency of indirect references, were analyzed. Table 2 below details the programs that were analyzed. For each, the frequency of dereferences in the program text (Insts per Dereference/Static), and the dynamic frequency of dereferences executed (Insts per Dereference/Dynamic) are shown.

The Class column classifies each program according to its spatial and temporal complexity. The spatial complexity, S, indicates the frequency of pointer arithmetic or indexing: either high (S+), medium(S), or low (S−). The temporal complexity, T, is an indicator of how often the program frees storage. If this factor is high (T+), the program frees storage throughout execution, if low (T−), the program never frees storage (or only at program completion).

TABLE 2

| Program | Instructions/ Dereference | | Class | Description |
| --- | --- | --- | --- | --- |
| Name | Static | Dynamic | | |
| Anagram | 106.3 | 7.6 | S+, T− | anagram generator |
| Backprop | 148.5 | 8.9 | S+, T− | neural net trainer |
| GNU BC | 15.5 | 7.6 | S, T+ | arbitrary precision calculator |
| Min-Span | 48.7 | 5.9 | S−, T+ | min spanning tree computation |
| Partition | 62.4 | 3.7 | S, T− | graph partitioning tool |
| YACR-2 | 37.1 | 14.0 | S+, T− | channel router |

All programs were compiled and executed on a DECstation 3100 using AT&T USL cfront version 3.0.1. The output of cfront (C code) was compiled using MIPS cc version 2.1 at optimization level '-O2'. All instruction counts were obtained with QPT {QPT:93}.

For all analyses, object attributes were only attached to pointer values. A 15-byte safe pointer 310 (275% overhead) was used in the unoptimized case: 4-byte pointer value, 4-byte base, 4-byte size, a 1-byte storage class specifier, and a 2-byte capability. For run-time resolved optimization, a 1-byte dirty flag, a 4-byte last index, and a 2-byte free counter were added for a total size of 22 bytes (450% overhead). Due to a bug in the C++ compiler, sizeof() in the safe-pointer implementation could not be used if the referent referred to itself; as a result, bc, minspan, and partition all required the size of the referent to be stored in the safe pointer 310, which added a 4-byte overhead for these programs. There were no space overheads for array variables, as all required object attributes are known at compile-time. Only the actual program code was rewritten, all system library routines remained unchecked. However, interface checking was performed. Whenever a system library is called, any pointer arguments are validated against the time and space bounds expected by the library routine. For example, if a call were made to fread(), the interface check would ensure that the destination of the read was live storage and that the entire length of the read operation would fit into the referent.

Results of Execution overhead measurements.

For the run-time-optimized executions, the normalized instruction counts range from 2.3 (yacr) to 6.4 (bc). This overhead reflects program performance without any compile-time optimization. While this performance degradation is probably acceptable for the development cycle of short or medium length program executions, it may still be prohibitively expensive for very long running programs, and it is certainly too costly a price to pay for in-field instrumentation of a program. Examining more closely the breakdown of the execution overheads yields much insight into how the performance of the checking methodology could be improved.

For each program, the overhead costs were broken down into five categories.

For bc, minspan, and partition, run-time check optimization paid off with a slightly lower execution cost for spatial checking. For anagram, backprop, and yacr, adding run-time checks resulted in a higher cost for spatial access checking; and in the case of backprop, a higher overall execution overhead.

These programs demonstrate the trade-offs involved in providing run-time check optimization. Run-time optimization adds the extra overhead of copying, maintaining, and checking the extra safe-pointer state. If this added overhead, plus the overhead of the required checks, is greater than doing all the checks, there is no advantage to run-time check optimization. With faster checks, compile-time optimization, and spatially complex programs, this trade-off becomes even more acute.

Since anagram, backprop, and yacr must execute many of their checks, they do not benefit from the run-time optimizations. For yacr, the effects are much less pronounced because dereferences are much less frequent (as shown in Table 2, above). Compile-time analysis will, therefore, be ineffective for most pointer and array intensive programs, as they are either spatially complex or rely heavily on dynamic storage, two properties which reduce the effectiveness of compile-time spatial check optimization.

The second effect to observe when comparing the optimized to unoptimized execution costs is that the greatest benefit of run-time check optimization always comes from eliding temporal checks. In fact, adding run-time optimization for temporal checks caused a significant decrease in all execution overheads except backprop. There are two aspects to this result. First, temporal checks are very expensive (requiring an associative search), so eliding one has a great performance advantage. Second, the run-time check optimization of temporal checks is very effective. Temporal checks are rarely required, even for bc and minspan, both of which free storage often. In the case of backprop, adding run-time optimization for temporal checks resulted in an increased execution overhead backprop has only one dynamic object, an array, so temporal checking is relatively cheap without any optimization (the capability is always at the head of the hash bucket chain). In this case, the cost of maintaining the extra storage required for the free counter outweighs the cost of executing all temporal checks.

The lower bound analyses also suggest that few program points require temporal checks; after inspecting the code, it is apparent that compile-time analysis (even when not inter-procedural) for eliding temporal checks will be very effective on these programs. Few of the dominating loops and procedures contain procedure calls or calls to free().

Adding checking code reduces the effectiveness of many traditional compiler optimizations. All check code is placed in-line except for calls to ValidCapability() and abort(). These functions are both externally defined, so the compiler must make conservative assumptions as to what actions they take. This conservative approximation has the effect of limiting the effectiveness of many optimizations such as invariant code motion, register allocation, copy propagation, and common subexpression elimination. Neither the ValidCapability() nor the abort() function produces any side-effects for normal executions. Hence, better compiler integration, i.e., providing a special channel of communication between the safe program generator and the compiler optimizer, would certainly increase the performance of the safe executions. It should be noted that many compilers, e.g. GNU "gcc", already understand the special semantics of abort() and use inter-procedural information related to this command to improve optimizations. One should be able to achieve the same results for ValidCapability().

Text size overheads were measured. All checking code, except the capability routines and what the C++ compiler extracts for expression simplification, is placed in-line into the original program text. Surprisingly, the text overheads were quite small; 35% to 300% for the unoptimized executables and 41% to 340% for the run-time optimized programs. The text sizes for the run-time optimized programs were larger due to additional code required for maintaining, copying, and checking the extra object attributes. There is a strong correlation between static dereference density and the resulting text overhead.

The data size overheads were measured as the total size of initialized (.data) and uninitialized (.bss) data segments plus the size of the heap segment when the program terminates execution. The data size overheads on the stack were not measured. All programs, except minspan, have data size overhead below 100%. backprop has the lowest overhead (less than 5%) because most of its storage is large global arrays which do not require any object attributes. minspan has the highest overhead (330%), which stems from the high density of pointers in its heap allocations, most of which contain eight pointers and three integers. Some of the run-time optimized programs have slightly larger overheads due to the additional object attributes.

To summarize the main points of the measurement results:
Execution overheads, even without compile-time optimization, are low enough to make the methodology useful during program development. However, the overheads are not likely low enough that programmers would release software with checking enabled.

The largest contributing factors to execution overhead are 1) safe-pointer structures are not register allocated, and 2) many traditional optimizations fail with the addition of checks. Other performance losses are attributed to the C++ compiler simplifying expressions through the use of static functions, and, due to a bug in the C++ compiler, the need to include the type size of the referent in the object attributes. None of these difficulties are without recourse, however. Better integration between the safe compiler and the optimizer could fix most problems.

Dynamically eliding spatial checks is generally ineffective, primarily because maintaining the extra state, and checking it, quickly outweighs the cost of executing all checks. The spatial check is very cheap to execute, and spatially complex programs tend to execute most of the checks anyway.

Temporal checks, on the other hand, are very expensive to perform and are rarely required, so run-time optimization shows to be beneficial in most cases.

The text and data size overhead are generally quite low. The text overheads for all programs with run-time optimization, range from 41% to 340%, with all but two below 100%. Data overheads range from 5% to 330%, with all but one below 100%. Run-time optimized executions have slightly larger text and data sizes.

Two examples of the operation of the safe programming technique will be described next. FIG. 13 shows a spatial access error, and FIG. 14 illustrates a temporal access error. Safe pointer values are specified as a 5-tuple with the following format: [{value}, {base}, {size}, {storageClass}, {capability}]. x indicates a don't care value. In the example shown in FIG. 13, a spatial access error is flagged when the program dereferences a safe pointer whose value is less than the base of the referent. In example shown in FIG. 14, a stale pointer, q is dereferenced. Even though the same storage has been reallocated to p, the capability originally assigned to q has been destroyed during the call to free(); thus, the temporal access error is detected.

The safe programming technique described above is significantly more reliable than the reference-chaining technique, became its correctness does not rely on tracking pointer values. In addition, it is not easy for the programmer to subvert the checking mechanism through, e.g., recasting and type-less calls to free() (the memory-deallocation function), since recast pointers carry a copy of the original pointer's attributes which will still be checked when used to access the object. Furthermore, storage-leak errors is enhanced, even in the presence of circular references (e.g., where a chain of pointers-to-pointers eventually points back to an earlier pointer in the chain).

By using a conservative collector in conjunction with the safe programming technique described above, one can make the process of detecting storage-leak errors intrinsically more reliable (through the elimination of false leaks and by reducing the possibility of false hits). False indications of storage-leak errors (called "false leaks") cannot occur under the safe programming technique described above. The base field always holds a pointer to the head of the allocation, and the program cannot manipulate this value. The problem of "false hits" (when non-pointer values appear to be pointers which reference areas in heap storage, thus missing actual storage-leak errors) can also be addressed, by checking for safe-pointer invariant information in any memory item which may be a pointer referencing areas in heap storage. One advantageous test is to ensure that both the capability and the free-counter values of the possible reference are valid. If an incrementing counter is used for each, each value should be less than the next unused counter value.

As noted in the background section, techniques which operate on object code only (such as Purify) cannot detect all memory access errors, because it is too difficult to determine the intended referent for each attempted access. The safe programming technique described above, on the other hand, can detect all memory access errors because it tracks not only the state of storage, but also the intended referents of all pointer values.

Although the safe programming technique described above can be implemented in many different programming languages, it is not portable across languages; that is, each given implementation must be tailored for a specific language. The safe programming technique described is quite portable across different platforms, however, especially if implemented as a source-to-source translator. Further, the technique is not limited by the language or the expressiveness of the language; that is, it can be applied successfully to compiled or interpreted languages with subscripted and mutable pointers, local references, unions, and explicit and type-less dynamic storage management.

The safe programming technique described above finds both spatial and temporal access errors. It is amenable to the use of run-time and compile-time optimizations through which access checks can be omitted ("elided"). Further, since the technique uses compile-time instrumentation, resource requirements are significantly lower than those required, for example, by the technique used in CodeCenter. Compile-time instrumentation also allows the safe programming technique described in the invention to employ compile-time optimizations.

It is to be understood that the above description is intended to be illustrative, and not restrictive. Many other embodiments will be apparent to those of skill in the art upon reviewing the above description. For instance, a method suited for a compilation process using the invention is described above, but a person skilled in the art could use an analogous method in an interpretation or translation process by using the invention to achieve a safe program in those environments. The scope of the invention should, therefore, be determined with reference to the appended claims, along with the full scope of equivalents to which such claims are entitled.

A listing of the references cited within are attached as an Appendix.

References

[Dragon: 86] A. V. Aho, R. Sethi, and J. D. Ulman. *Compilers: Principles, Techniques, and Tools*. Addison-Wesley, Reading, Mass., 1986.

[Asu:92] Jonathan M. Asuru. Optimization of array subscript range checks. *ACM Letters on Programming Languages and Systems*, 1(2): 109–118, June 1992.

[AWZ:88] Bowen Alpern, Mark N. Wegman, and F. Kenneth Zadeck. Detecting equality of variables in programs. In *Conference Record of the 15th Annual ACM Symposium on Principles of Programming Languages*, pages 1–11, San Diego, Calif., January 1988.

[Boehm:93] Hans-Juergen Boehm. Space efficient conservative garbage collection. *Proceedings of the ACM SIGPLAN '93 Conference on Programming Language Design and Implementation*, 28(6): 197–204, June 1993.

[Boehm:88] Hans-Juergen Boehm and Mark Weiser. Garbage collection in an uncooperative environment. *Software-Practice and Experience*, 18(9): 807–820, September 1988.

[MIPS:F77] MIPS Computer Corporation. MIPS Fortrann 77 compiler (f77) user's guide, 1987.

[ED:93] John R. Ellis and David L. Detlefs. Safe, efficient garbage collection for C++. Technical Report 102, DEC Systems Research Center, June 1993.

[Edelson:91] D. R. Edelson and I. Pohl. Smart pointers: They're smart but not pointers. *Proceedings of the 1991 Usenix C++ Conference*, April 1991.

[FH:88] Anthony J. Field and Peter G. Harrison. *Functional Programming*. Addison-Wesley Publishing Company, 1988.

[Fischer:80] Charles N. Fischer and Richard J. LeBlanc. The implementation of run-time diagnostics in Pascal. *IEEE Transactions on Software Engineering*, SE-6(4): 313–319, 1980.

[Ginter:92] Andrew Ginter. Design alternatives for a cooperative garbage collector for the C++ programming language. Technical Report 91/417/01, Department of Computer Science, University of Calgary, 1992.

[Gup:90] Rajiv Gupta. A fresh look at optimizing array bound checking. *Proceedings of the ACM SIGPLAN '90 Conference on Programming Language Design and, Implementation*, pages 272–282, June 1990.

[Har:77] W. Harrison. Compiler analysis of the value ranges of variables. *IEEE Transactions on Software Engineering*, 3(3): 243–250, 1977.

[Purify:92] Reed Hastings and Bob Joyce. Purify: fast detection of memory leaks and access errors. *Proceedings of the Winter Usenix Conference*, 1992.

[Kaufer:88] Stephen Kaufer, Russel Lopez, and Sesha Pratap. Saber-C: an interpreter-based programming environment for the C language. *Proceedings of the Summer Usenix Conference*, pages 161–171, 1988.

[Lar:93] James R. Larus. Efficient program tracing. *IEEE Computer*, 26(5):52–61, May 1993.

[Lee:91] Peter Lee, editor. *Topics in Advanced Language Implementation* The MIT Press, Cambridge, Mass., 1991.

[Miller:90] Barton P. Miller, Lars Fredriksen, and Bryan So. An empirical study of the reliability of Unix utilities. *Communications of the ACM*, 33(12):32–44, December 1990.

[Ross:87] Graham Ross. Integral C—a practical environment for C programming. In *Proceedings of the ACM SIG-Soft/SIGPLAN Software Engineering Symposium on Practical Software Development Environments* (SIGPLAN Notices), pages 42–48. Association for Computing Machinery, January 1987.

[RWZ:88] B. K. Rosen, M. N. Wegman, and F. K. Zadeck. Global value numbers and redundant computations. In *Conference Record of the 15th Annual ACM Symposium on Principles of Programming Languages*, pages 12–27, San Diego, Calif., January 1988.

[Sullivan:91] Mark Sullivan and Ram Chillarege. Software defects and their impact on system availability—a study of field failures in operating systems. *Digest of the 21st International Symposium on Fault Tolerant Computing*, pages 2–9, June 1991.

[Steffen:92] Joseph L. Steffen. Adding run-time checking to the Portable C Compiler. *Software—Practice and Experience*, 22(4):305–316, 1992.

[Zorn:88] Benjamin Zorn and Paul Hilfinger. A memory allocation profiler for C and Lisp programs. *Proceedings of the Summer Usenix Conference*, pages 223–237, 1988.

What is claimed is:

1. A method for detecting memory access errors which occur while executing a computer program, wherein the computer program includes a pointer to a data object, said method comprising the steps of:

providing a spatial attribute for said data object, said spatial attribute defining an address space within which valid accesses may be made to said data object;

associating said spatial attribute with said pointer;

providing a temporal attribute for said data object, said temporal attribute defining a period of time within which valid accesses may be made to said data object, wherein the step of providing said temporal attribute comprises the steps of:

providing a temporal validity number having a temporal validity number location; and providing a temporal capability number;

associating said temporal capability number with said pointer;

providing a dereference to said pointer;

determining if said dereference falls outside said address space;

if said dereference falls outside said address space, flagging a spatial error;

determining from said temporal capability number and said temporal validity number whether a temporal error has occurred; and if a temporal error has occurred, flagging said temporal error.

2. The method according to claim 1, wherein the step of providing a spatial attribute comprises the step of providing a size attribute indicative of said address space.

3. The method according to claim 2, wherein the step of providing a spatial attribute further comprises the step of providing an address attribute indicative of a base address.

4. The method according to claim 1, wherein said address space has a lower bound and an upper bound and wherein the step of providing a spatial attribute comprises the steps of:
- providing a low-end address attribute indicative of said lower bound; and
- providing a high-end address attribute indicative of said higher bound.

5. The method according to claim 1, wherein the step of providing a temporal attribute further comprises the step of providing a storage class attribute.

6. The method according to claim 5, wherein the step of providing a storage class attribute comprises the step of specifying storage classes which distinguish heap and local data objects.

7. The method according to claim 6, wherein the step of providing a spatial attribute comprises the step of providing a size attribute indicative of the address space.

8. The method according to claim 7, wherein the step of providing a spatial attribute further comprises the step of providing an address attribute indicative of a base address.

9. The method according to claim 6, wherein said address space has a lower bound and an upper bound and wherein the step of providing a spatial attribute comprises the steps of:
- providing a low-end address attribute indicative of said lower bound; and
- providing a high-end address attribute indicative of said higher bound.

10. A method of detecting a memory access error encountered when executing program code including a pointer pointing to a variable, the method comprising the steps of:
- assigning temporal attributes defining temporal status for said pointer, wherein the step of assigning temporal attributes comprises the steps of:
  - providing a temporal validity number associated with said variable;
  - providing a temporal capability number; and
  - associating said temporal capability number with said pointer;
- assigning spatial attributes defining an address space valid for said pointer;
- executing a memory access check on a memory access, wherein the step of executing a memory access check comprises the steps of:
  - determining from said temporal capability number and said temporal validity number whether a temporal error has occurred; and
  - determining whether said memory access is to an address within said valid address space;
- if a temporal status has occurred, flagging said temporal error; and
- if said memory access is to an address outside said valid address space, flagging a spatial error.

11. The method according to claim 10 wherein the step of determining whether a temporal error has occurred comprises the step of accessing said temporal validity number through a hash table.

12. The method according to claim 10 wherein the temporal validity number has a temporal validity number location;
wherein the step of assigning temporal attributes further comprises the steps of:
- providing a backpointer specifying said temporal validity number location; and
- associating said backpointer with said pointer; and
wherein the step of determining whether a temporal error has occurred comprises the step of accessing said temporal validity number via said backpointer.

13. A method for detecting memory access errors which occur while executing a computer program, wherein the computer program includes a pointer to a data object, the method comprising the steps of:
- providing a counter having a count for tracking memory deallocations;
- providing a spatial attribute for said data object, said spatial attribute defining an address space within which valid accesses may be made to said data object;
- associating said spatial attribute with said pointer;
- associating said temporal attribute with said pointer;
- providing a temporal attribute for said data object, wherein the step of providing said temporal attribute comprises the steps of:
  - providing a temporal validity number having a temporal validity number location; and
  - providing a temporal capability number;
- associating said temporal capability number with said pointer;
- providing a first dereference and a second dereference to said pointer wherein said first dereference occurs prior to said second dereference;
- determining if said second dereference falls outside said address space;
- if said second dereference falls outside said address space, flagging a spatial error;
- determining if said count has changed since said fast dereference; and
- if said count has changed since said first dereference, verifying said temporal attributes, wherein the step of verifying said temporal attributes comprises the steps of:
  - determining from said temporal capability number and said temporal validity number whether a temporal error has occurred; and
  - if a temporal error has occurred, flagging said temporal error.

14. The method according to claim 13 wherein the step of providing a temporal attribute further comprises the step of providing a storage class attribute which distinguishes heap and local data objects.

15. A system for detecting a memory access error in a computer program executing on a computer, the system comprising:
- means for assigning object attributes to a pointer, wherein said object attributes comprise:
  - a temporal capability number; and
  - a spatial attribute defining an address space valid for said pointer;
- means for assigning a temporal validity number;
- means for adding memory access check instructions to said computer program, wherein said memory access check instructions comprise:
  - instructions which determine from said temporal capability number and said temporal validity number whether a temporal error has occurred; and
  - instructions which determine whether a memory access made within said computer program is to an address within said valid address space.

16. The system according to claim 15 wherein the instructions for determining whether a temporal error has occurred comprise an instruction for accessing said temporal validity number through a hash table.

17. The system according to claim 15 wherein:

the temporal validity number has a temporal validity number location;

the temporal attributes further include a backpointer specifying said temporal validity number location, wherein said backpointer is associated with said pointer; and the instructions for determining whether a temporal error has occurred comprise an instruction for accessing said temporal validity number via said backpointer.

18. The system according to claim 15 wherein the instructions for determining whether a temporal error has occurred comprise an instruction for determining whether a temporal memory access check can be elided.

19. The system according to claim 15 wherein the instructions for determining whether a spatial error has occurred comprise an instruction for determining whether a spatial memory access check can be elided.

20. The system according to claim 15 wherein the means for adding memory access check instructions to said computer program comprise means for determining whether a memory access check can be elided.

* * * * *